US011901624B1

(12) United States Patent
Leung et al.

(10) Patent No.: US 11,901,624 B1
(45) Date of Patent: Feb. 13, 2024

(54) WIDEBAND HIGH-GAIN OMNIDIRECTIONAL BICONICAL ANTENNA FOR MILLIMETER-WAVE APPLICATIONS

(71) Applicant: City University of Hong Kong, Kowloon (HK)

(72) Inventors: Kwok Wa Leung, Kowloon Tong (HK); Zhiyi Zhang, Kowloon Tong (HK); Kai Lu, Guangzhou (CN)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 17/938,429

(22) Filed: Oct. 6, 2022

(51) Int. Cl.
*H01Q 13/04* (2006.01)

(52) U.S. Cl.
CPC .................................. *H01Q 13/04* (2013.01)

(58) Field of Classification Search
CPC ...................................................... H01Q 13/04
See application file for complete search history.

(56) References Cited

U.S. PATENT DOCUMENTS 4,461,039 A * 7/1984 Hersman .............. H03D 9/0608 455/330
9,356,340 B2 5/2016 Nilsson
10,403,986 B2 9/2019 Ming et al.
10,910,700 B2 2/2021 Moon et al.
2001/0004249 A1 * 6/2001 Sharp .................. H01Q 21/064 343/824
2015/0280317 A1 * 10/2015 Morin ...................... H01Q 9/28 343/795

FOREIGN PATENT DOCUMENTS

CN 101777704 7/2010
CN 101958463 10/2011
CN 111541019 8/2020
CN 107863996 10/2020

OTHER PUBLICATIONS

Y. Li, L. Ge, J.Wang, S. Da, D. Cao, J.Wang, and Y. Liu, "3-D printed high-gain wideband waveguide fed horn antenna arrays for millimeter-wave applications," IEEE Trans. Antennas Propag., vol. 67, No. 5, pp. 2868-2877, May 2019.
S. Lin, M.-Q. Liu, X. Liu, Y.-C. Lin, Y. Tian, J. Lu, and Z.-H. Zhao, "Design of omnidirectional high-gain antenna with broadband radiant load in C wave band," Prog. Electromagn. Res. C, vol. 33, pp. 243-258, 2012.

(Continued)

*Primary Examiner* — Hoang V Nguyen
(74) *Attorney, Agent, or Firm* — Renner, Kenner, Greive, Bobak, Taylor & Weber

(57) ABSTRACT

An omnidirectional biconical antenna, which includes a first funnel-shaped plate having a wide end and a narrow end; a second funnel-shaped plate having a wide end and a narrow end; and an annular metal lens delimited by the second funnel-shaped plate and the first funnel-shaped plate. The second funnel-shaped plate is inversely positioned relative to the first funnel-shaped plate, such that the narrow ends of the second funnel-shaped plate and the first funnel-shaped plate point to each other.

11 Claims, 16 Drawing Sheets

(56) References Cited

OTHER PUBLICATIONS

Z. Zhou, Y. Li, Y. He, Z. Zhang, and P.-Y. Chen, "A slender Fabry-Perot antenna for high-gain horizontally polarized omnidirectional radiation," IEEE Trans. Antennas Propag., vol. 69, No. 1, pp. 526-531, Jan. 2021.
G. Zheng and B. Sun, "High-gain normal-mode omnidirectional circularly polarized antenna," IEEE Antennas Wirel. Propag. Lett., vol. 17, No. 6, pp. 1104-1108, Jun. 2018.
P. Luo, C. Nie, Q. Gong, and Y. Cui, "Wideband dual-polarized quasi-omnidirectional antenna with high isolation for mobile applications in high-speed vehicles," Int. J. Antennas Propag., vol. 2019, pp. 1-8, Feb. 2019.
J. L. Volakis, Ed., Antenna engineering handbook, 4th ed. New York: McGraw-Hill, 2007.
Y. Yu, J. Xiong, and R. Wang, "A wideband omnidirectional antenna array with low gain variation," IEEE Antennas Wirel. Propag. Lett., vol. 15, pp. 386-389, Dec. 2016.
H. Li, X. Du, and Y. Yin, "High gain omnidirectional dipole array antenna with slot coupler," in 2018 International Conference on Sensor Networks and Signal Processing (SNSP), Oct. 2018, pp. 334-337.
W. Cao and Y. Ma, "Ku-band omnidirectional high gain antenna," in 2020 IEEE 3rd International Conference on Electronic Information and Communication Technology (ICEICT), Nov. 2020, pp. 632-635.
Z. Liang, Y. Li, X. Feng, J. Liu, J. Qin, and Y. Long, "Microstrip magnetic monopole and dipole antennas with high directivity and a horizontally polarized omnidirectional pattern," IEEE Trans. Antennas Propag., vol. 66, No. 3, pp. 1143-1152, Mar. 2018.
W. Lin and R. W. Ziolkowski, "High-directivity, compact, omnidirectional horizontally polarized antenna array," IEEE Trans. Antennas Propag., vol. 68, No. 8, pp. 6049-6058, Aug. 2020.
S. Liao, P. Chen, and Q. Xue, "Ka-band omnidirectional high gain stacked dual bicone antenna," IEEE Trans. Antennas Propag., vol. 64, No. 1, pp. 294-299, Jan. 2016.
W. Cao and L. Lian, "X-band omnidirectional high gain biconical array antenna," in 2020 IEEE 3rd International Conference on Electronic Information and Communication Technology (ICEICT), Nov. 2020, pp. 195-198.
P. Sanchez-Olivares, J. L. Masa-Campos, E. Garcia-Marin, and D. Escalona-Moreno, "High-gain conical-beam traveling-wave array antenna based on a slotted circular waveguide at Ku-band," IEEE Trans. Antennas Propag., vol. 68, No. 8, pp. 6435-6440, Aug. 2020.
X. Yang, Y. Liu, and S.-X. Gong, "Design of a wideband omnidirectional antenna with characteristic mode analysis," IEEE Antennas Wirel. Propag. Lett., vol. 17, No. 6, pp. 993-997, Jun. 2018.
S. Liu, D. Yang, Y. Chen, K. Sun, X. Zhang, and Y. Xiang, "Design of single-layer broadband omnidirectional metasurface antenna under single mode resonance," IEEE Trans. Antennas Propag., vol. 69, No. 10, pp. 6947-6952, Oct. 2021.
L. H. Ye, Y. Zhang, X. Y. Zhang, and Q. Xue, "Broadband horizontally polarized omnidirectional antenna array for base-station applications," IEEE Trans. Antennas Propag., vol. 67, No. 4, pp. 2792-2797, Apr. 2019.
K. Fan, Z.-C. Hao, Q. Yuan, J. Hu, G. Q. Luo, and W. Hong, "Wideband horizontally polarized omnidirectional antenna with a conical beam for millimeter-wave applications," IEEE Trans. Antennas Propag., vol. 66, No. 9, pp. 4437-4448, Sep. 2018.
X.-W. Dai, Z.-Y. Wang, C.-H. Liang, X. Chen, and L.-T. Wang, "Multiband and dual-polarized omnidirectional antenna for 2g/3g/lte application," IEEE Antennas Wirel. Propag. Lett., vol. 12, pp. 1492-1495, 2013.
X. L. Quan, R. Li, J. Y. Wang, and Y. H. Cui, "Development of a broadband horizontally polarized omnidirectional planar antenna and its array for base stations," Prog. Electromagn. Res., vol. 128, pp. 441-456, 2012.
C.-X. Mao, M. Khalily, P. Xiao, T. W. C. Brown, and S. Gao, "Planar sub-millimeter-wave array antenna with enhanced gain and reduced side-lobes for 5g broadcast applications," IEEE Trans. Antennas Propag., vol. 67, No. 1, pp. 160-168, Jan. 2019.
Z. Nie, W. C. Chew, and Y. T. Lo, "Analysis of the annular-ring-loaded circular-disk microstrip antenna," IEEE Trans. Antennas Propag., vol. 38, No. 6, pp. 806-813, Jun. 1990.
A. Al-Zoubi, F. Yang, and A. Kishk, "A broadband center-fed circular patch-ring antenna with a monopole like radiation pattern," IEEE Trans. Antennas Propag., vol. 57, No. 3, pp. 789-792, Mar. 2009.
S. Liu, W. Wu, and D.-G. Fang, "Wideband monopole-like radiation pattern circular patch antenna with high gain and low cross-polarization," IEEE Trans. Antennas Propag., vol. 64, No. 5, pp. 2042-2045, May 2016.
S. Lin, S. Liao, Y. Yang, W. Che, and Q. Xue, "Gain enhancement of low-profile omnidirectional antenna using annular magnetic dipole directors," IEEE Antennas Wirel. Propag. Lett., vol. 20, No. 1, pp. 8-12, Jan. 2021.
J. Liu, S. Zheng, Y. Li, and Y. Long, "Broadband monopolar microstrip patch antenna with shorting vias and coupled ring," IEEE Antennas Wirel. Propag. Lett., vol. 13, pp. 39-42, 2014.
N. Zhang, W. X. Jiang, H. F. Ma, W. X. Tang, and T. J. Cui, "Compact high-performance lens antenna based on impedance-matching gradient-index metamaterials," IEEE Trans. Antennas Propag., vol. 67, No. 2, pp. 1323-1328, Feb. 2019.
W. E. Kock, "Metal-lens antennas," Proc. IRE, vol. 34, No. 11, pp. 828-836, 1946.
W. E. Kock, "Path-length microwave lenses," Proc. IRE, vol. 37, No. 8, pp. 852-855, 1949.
D. M. Pozar, Microwave Engineering, 4th ed. New York, NY, USA: John Wiley & Sons, 2011.

* cited by examiner

Table IV
PERFORMANCE COMPARISON OF PROPOSED ANTENNA AND OTHER OMNIDIRECTIONAL GAIN-ENHANCED ANTENNAS DESIGNS

| Ref. | Dimensions $(\lambda_0^3)^s$ | $f_0$ (GHz) | 10-dB Impedance bandwidth | Realized Gain (dBi) | Gain variation (dB) | 1-dB Gain bandwidth | 3-dB Gain bandwidth |
|---|---|---|---|---|---|---|---|
| [3] | 3.0×0.3×0.03 | 2.5 | 3.6% (2.4-2.5 GHz) | 8.0 | < 3 | 2% | 3.6% |
| [12] | 3.3×0.2×0.1 | 10.0 | 8.0% (9.6-10.4 GHz) | 8.2 | < 3 | 2.5% | 11.0% |
| [14] | π×16.7²×12.1 | 28.2 | 14.2% (26.2-30.2 GHz) | 12.5 | < 1 | 14.2% | 14.2% |
| [20] | π×2.3²×0.9 | 44.2 | 22.9% (39.0-49.3 GHz) | 4.75 | < 3 | 13.9% | 22.9% |
| [21] | 7.1×6.7×1.1 | 2.0 | 34% (1.67-2.35 GHz) | 7.5 | < 3 | 10.5% | 34% |
| [22] | 5.9×1.4×0.03 | 27.0 | 18.9% (24.0-29.0 GHz) | 11 | ~10 | 11.0% | 14.4% |
| This Work | π×5.6²×5.7 | 32.5 | 43.9% (25.6-40.0 GHz) | 9.2 | < 3 | 20.0% | 43.9% |

s*$\lambda_0$ is the free space wavelength at the center frequency $f_0$.

Fig. 24

WIDEBAND HIGH-GAIN OMNIDIRECTIONAL BICONICAL ANTENNA FOR MILLIMETER-WAVE APPLICATIONS

FIELD OF INVENTION

This invention relates to radiofrequency (RF) devices, and in particular to omnidirectional antennas.

BACKGROUND OF INVENTION

Omnidirectional antennas have been widely used in wireless communication systems because they can provide full azimuthal coverage [1]. At millimeter-wave (mm-wave) frequencies, high-gain broadband antennas are generally needed to compensate for high atmosphere propagation loss and limited transmitting power [2]. High-gain omnidirectional antennas are useful for communications in remote areas where the populations are widely dispersed. They are also useful for point-to-multipoint applications such as portable base stations [2] and wireless local area networks [3]-[5]. In addition, high-gain omnidirectional antennas can be frequently found in high-speed vehicle/airborne mobile communications [6]. Therefore, it is of great interest to develop a high-gain, wideband mm-wave omnidirectional antenna.

It is common to deploy a collinear antenna array to increase the omnidirectional antenna gain [7]. Elements of the collinear antenna array can be designed with either electrical dipole [8]-[10], magnetic dipole [11], [12], or Fabry-Perot antenna [3]. However, collinear arrays have some drawbacks. For example, it suffers from a high profile and a limited 10-dB impedance bandwidth of ~8% [3], [9]-[12]. Moreover, its feed-network loss can be high at mm-wave frequencies [13].

To have a wider bandwidth, a traveling-wave antenna array can be used, such as a biconical antenna array [13], [14] and a slotted waveguide antenna array [15]. By using a traveling-wave antenna array, the impedance bandwidth can be more than 20%. However, the two arrays as mentioned above are bulky; the antenna length or radius is larger than $15\lambda_0$ [13], [15], where $\lambda_0$ is the operating wavelength in air. Their sizes may limit their applications.

Recently, some metasurface antennas have been investigated [16], [17]. By using characteristic mode analysis (CMA), a wide impedance bandwidth and good omnidirectionality can be obtained for this kind of antennas [16]. An aperiodic metasurface antenna can obtain a gain of ~5 dBi [17]. Nevertheless, it is difficult for metasurface antennas to maintain an excellent omnidirectional radiation pattern across a wide impedance bandwidth because they do not have a pure operating mode. This problem was also found in some designs [18]-[22] that combine several directional antennas to obtain pattern symmetry.

Omnidirectional antennas can also be obtained by exiting the $TM_{0n}$ mode of circular patch antennas with annular rings [23]-[27]. Some of them have a gain of higher than 6 dBi [25], [27]. However, their radiation patterns have either a tilting problem that leads to a low azimuth gain [23]-[25] or a poor side-lobe level (SLL) [26]. These problems have also been found in other kinds of high-gain omnidirectional antennas or antenna arrays [11]-[15]. Lenses have been used to increase antenna gains for many years. A uniform aperture distribution can be obtained using a dielectric lens by delaying the phase at the aperture center [28]. Alternatively, an E-plane metal lens can be used to accelerate the phase at the aperture edge [29]. Both design approaches are frequency sensitive and may lead to a narrow bandwidth that limits their applications. The H-plane metal lens can achieve the same objective by designing the same propagation length [30]. However, some existing designs are asymmetrical. Also, the design requirement can be met at a particular focal length only for a directional antenna. Thus far, little or no wideband mm-wave omnidirectional designs with a high gain and a low SLL have been found.

REFERENCES

The following references are referred to throughout this specification, as indicated by the numbered brackets:

[1] C. A. Balanis, Antenna Theory: Analysis and Design, 4th ed. New York: Wiley, 2016.

[2] Y. Li, L. Ge, J. Wang, S. Da, D. Cao, J. Wang, and Y. Liu, "3-D printed high-gain wideband waveguide fed horn antenna arrays for millimeter-wave applications," IEEE Trans. Antennas Propag., vol. 67, no. 5, pp. 2868-2877, May 2019.

[3] S. Lin, M.-Q. Liu, X. Liu, Y.-C. Lin, Y. Tian, J. Lu, and Z.-H. Zhao, "Design of omnidirectional high-gain antenna with broadband radiant load in C wave band," Prog. Electromagn. Res. C, vol. 33, pp. 243-258, 2012.

[4] Z. Zhou, Y. Li, Y. He, Z. Zhang, and P.-Y. Chen, "A slender Fabry-Perot antenna for high-gain horizontally polarized omnidirectional radiation," IEEE Trans. Antennas Propag., vol. 69, no. 1, pp. 526-531, January 2021.

[5] G. Zheng and B. Sun, "High-gain normal-mode omnidirectional circularly polarized antenna," IEEE Antennas Wirel. Propag. Lett., vol. 17, no. 6, pp. 1104-1108, June 2018.

[6] P. Luo, C. Nie, Q. Gong, and Y. Cui, "Wideband dual-polarized quasi-omnidirectional antenna with high isolation for mobile applications in high-speed vehicles," Int. J. Antennas Propag., vol. 2019, pp. 1-8, February 2019.

[7] J. L. Volakis, Ed., Antenna engineering handbook, 4th ed. New York: McGraw-Hill, 2007.

[8] Y. Yu, J. Xiong, and R. Wang, "A wideband omnidirectional antenna array with low gain variation," IEEE Antennas Wirel. Propag. Lett., vol. 15, pp. 386-389, December 2016.

[9] H. Li, X. Du, and Y. Yin, "High gain omnidirectional dipole array antenna with slot coupler," in 2018 International Conference on Sensor Networks and Signal Processing (SNSP), October 2018, pp. 334-337.

[10] W. Cao and Y. Ma, "Ku-band omnidirectional high gain antenna," in 2020 IEEE 3rd International Conference on Electronic Information and Communication Technology (ICEICT), November 2020, pp. 632-635.

[11] Z. Liang, Y. Li, X. Feng, J. Liu, J. Qin, and Y. Long, "Microstrip magnetic monopole and dipole antennas with high directivity and a horizontally polarized omnidirectional pattern," IEEE Trans. Antennas Propag., vol. 66, no. 3, pp. 1143-1152, March 2018.

[12] W. Lin and R. W. Ziolkowski, "High-directivity, compact, omnidirectional horizontally polarized antenna array," IEEE Trans. Antennas Propag., vol. 68, no. 8, pp. 6049-6058, August 2020.

[13] S. Liao, P. Chen, and Q. Xue, "Ka-band omnidirectional high gain stacked dual bicone antenna," IEEE Trans. Antennas Propag., vol. 64, no. 1, pp. 294-299, January 2016.

[14] W. Cao and L. Lian, "X-band omnidirectional high gain biconical array antenna," in 2020 IEEE 3rd International Conference on Electronic Information and Communication Technology (ICEICT), November 2020, pp. 195-198.

[15] P. Sanchez-Olivares, J. L. Masa-Campos, E. Garcia-Marin, and D. Escalona-Moreno, "High-gain conical-beam traveling-wave array antenna based on a slotted circular waveguide at Ku-band," IEEE Trans. Antennas Propag., vol. 68, no. 8, pp. 6435-6440, August 2020.

[16] X. Yang, Y. Liu, and S.-X. Gong, "Design of a wideband omnidirectional antenna with characteristic mode analysis," IEEE Antennas Wirel. Propag. Lett., vol. 17, no. 6, pp. 993-997, June 2018.

[17] S. Liu, D. Yang, Y. Chen, K. Sun, X. Zhang, and Y. Xiang, "Design of single-layer broadband omnidirectional metasurface antenna under single mode resonance," IEEE Trans. Antennas Propag., vol. 69, no. 10, pp. 6947-6952, October 2021.

[18] L. H. Ye, Y. Zhang, X. Y. Zhang, and Q. Xue, "Broadband horizontally polarized omnidirectional antenna array for base-station applications," IEEE Trans. Antennas Propag., vol. 67, no. 4, pp. 2792-2797, April 2019.

[19] K. Fan, Z.-C. Hao, Q. Yuan, J. Hu, G. Q. Luo, and W. Hong, "Wideband horizontally polarized omnidirectional antenna with a conical beam for millimeter-wave applications," IEEE Trans. Antennas Propag., vol. 66, no. 9, pp. 4437-4448, September 2018.

[20] X.-W. Dai, Z.-Y. Wang, C.-H. Liang, X. Chen, and L.-T. Wang, "Multiband and dual-polarized omnidirectional antenna for 2 g/3 g/lte application," IEEE Antennas Wirel. Propag. Lett., vol. 12, pp. 1492-1495, 2013.

[21] X. L. Quan, R. Li, J. Y. Wang, and Y. H. Cui, "Development of a broadband horizontally polarized omnidirectional planar antenna and its array for base stations," Prog. Electromagn. Res., vol. 128, pp. 441-456, 2012.

[22] C.-X. Mao, M. Khalily, P. Xiao, T. W. C. Brown, and S. Gao, "Planar sub-millimeter-wave array antenna with enhanced gain and reduced side-lobes for 5 g broadcast applications," IEEE Trans. Antennas Propag., vol. 67, no. 1, pp. 160-168, January 2019.

[23] Z. Nie, W. C. Chew, and Y. T. Lo, "Analysis of the annular-ring-loaded circular-disk microstrip antenna," IEEE Trans. Antennas Propag., vol. 38, no. 6, pp. 806-813, June 1990.

[24] A. Al-Zoubi, F. Yang, and A. Kishk, "A broadband center-fed circular patch-ring antenna with a monopole like radiation pattern," IEEE Trans. Antennas Propag., vol. 57, no. 3, pp. 789-792, March 2009.

[25] S. Liu, W. Wu, and D.-G. Fang, "Wideband monopole-like radiation pattern circular patch antenna with high gain and low cross-polarization," IEEE Trans. Antennas Propag., vol. 64, no. 5, pp. 2042-2045, May 2016.

[26] S. Lin, S. Liao, Y. Yang, W. Che, and Q. Xue, "Gain enhancement of low-profile omnidirectional antenna using annular magnetic dipole directors," IEEE Antennas Wirel. Propag. Lett., vol. 20, no. 1, pp. 8-12, January 2021.

[27] J. Liu, S. Zheng, Y. Li, and Y. Long, "Broadband monopolar microstrip patch antenna with shorting vias and coupled ring," IEEE Antennas Wirel. Propag. Lett., vol. 13, pp. 39-42, 2014.

[28] N. Zhang, W. X. Jiang, H. F. Ma, W. X. Tang, and T. J. Cui, "Compact high-performance lens antenna based on impedance-matching gradient-index metamaterials," IEEE Trans. Antennas Propag., vol. 67, no. 2, pp. 1323-1328, February 2019.

[29] W. E. Kock, "Metal-lens antennas," Proc. IRE, vol. 34, no. 11, pp. 828-836, 1946.

[30] W. E. Kock, "Path-length microwave lenses," Proc. IRE, vol. 37, no. 8, pp. 852-855, 1949.

[31] D. M. Pozar, Microwave Engineering, 4th ed. New York, NY, USA: John Wiley & Sons, 2011.

SUMMARY OF INVENTION

Accordingly, the present invention, in one aspect, is an omnidirectional biconical antenna, which includes a first funnel-shaped plate having a wide end and a narrow end; a second funnel-shaped plate having a wide end and a narrow end; and an annular metal lens delimited by the second funnel-shaped plate and the first funnel-shaped plate. The second funnel-shaped plate is inversely positioned relative to the first funnel-shaped plate, such that the narrow ends of the second funnel-shaped plate and the first funnel-shaped plate point to each other.

In some embodiments, the annular metal lens contains a plurality of annular metal plates concentrically arranged with and located between the second funnel-shaped plate and the first funnel-shaped plate, whilst being disconnected from each other.

In some embodiments, at least one of the annular metal plates has a spatially curved shape.

In some embodiments, the at least one of the annular metal plates has a shape described by a sine function and a ring function in altitude and azimuth planes.

In some embodiments, the second funnel-shaped plate and the first funnel-shaped plate are part of the annular metal lens.

In some embodiments, the omnidirectional biconical antenna contains a plurality of holding rings each sandwiched by two adjacent plates among the second funnel-shaped plate, the first funnel-shaped plate, and the plurality of annular metal plates.

In some embodiments, the plurality of holding rings is aligned in a first direction defined by a rotational axis of the second funnel-shaped plate and the first funnel-shaped plate.

In some embodiments, the plurality of holding rings is made of Teflon.

In some embodiments, the at least one of the annular metal plates has a thickness in an altitude plane that substantially increases along a second direction from a rotational axis of the second funnel-shaped plate and the first funnel-shaped plate and extending substantially radially outward.

In some embodiments, at least one of the second funnel-shaped plate and the first funnel-shaped plate includes, between its narrow end and wide end, a flat portion between two ramp portions.

In some embodiments, the number of the plurality of annular metal plates is an odd number. A first part of the plurality of annular metal plates located on one side of a central plate among the plurality of annular metal plates is symmetric to a second part of the plurality of annular metal plates located on another side of the central plate.

One can see that embodiments of the invention provide omnidirectional biconical antennas which have wide impedance and gain bandwidths as compared to existing gain-enhanced omnidirectional antennas. The omnidirectional biconical antennas have a good impedance match and a stable gain. Also, the omnidirectional biconical antennas are compact in size because the annular metal lens is integrated into the antenna. The annular metal lens contains rotationally symmetric annular metal plates to convert the original quasi-cylindrical wavefront into a nearly planar wavefront across a wide frequency range, giving a wideband high-gain antenna. Using the annular metal lens, in-phase distribution at the antenna aperture can be obtained. Also, its size is compact because the annular metal lens is integrated with the biconical antenna. Moreover, the lens is metallic, and therefore the omnidirectional biconical antennas according to embodiments of the invention can handle higher power than those using a dielectric lens or metasurface.

The foregoing summary is neither intended to define the invention of the application, which is measured by the claims, nor is it intended to be limiting as to the scope of the invention in any way.

BRIEF DESCRIPTION OF FIGURES

The foregoing and further features of the present invention will be apparent from the following description of embodiments which are provided by way of example only in connection with the accompanying figures, of which:

FIG. 24 shows a table comparing performance of a proposed antenna with other omnidirectional gain-enhanced antenna designs.

In the drawings, like numerals indicate like parts throughout the several embodiments described herein.

DETAILED DESCRIPTION

Figure 1:
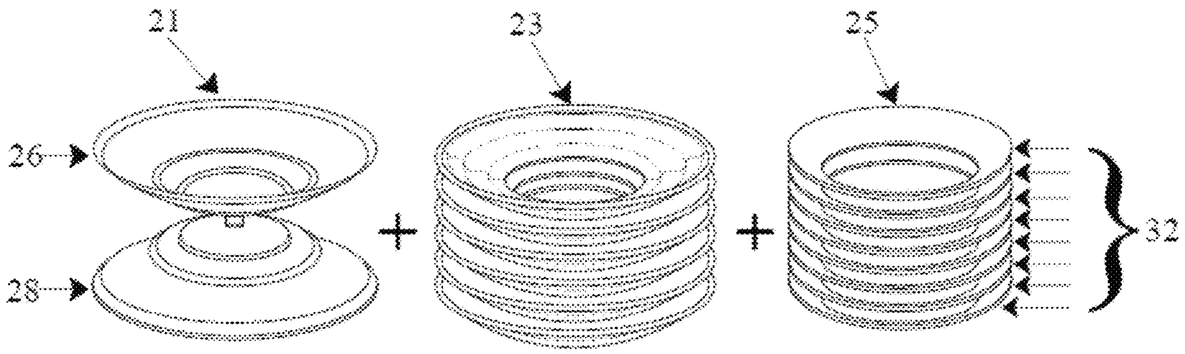
FIG. 1 shows an exploded view of an omnidirectional biconical antenna according to a first embodiment of the invention.
Figure 2:
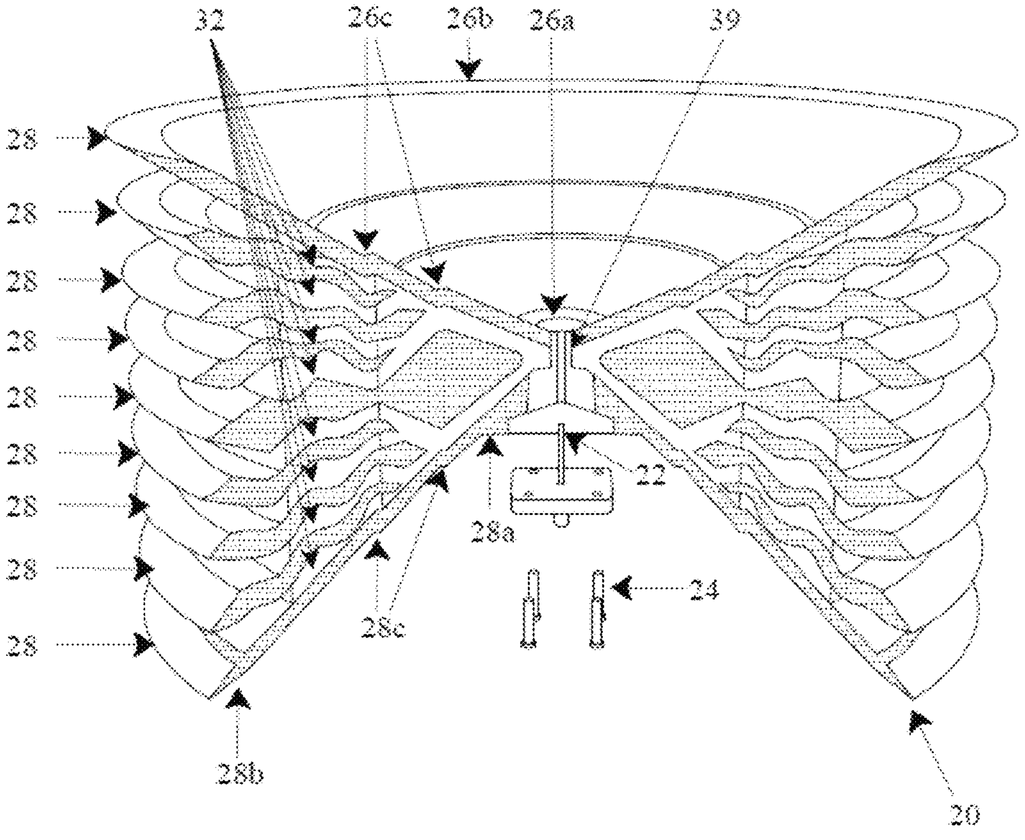
FIG. 2 is an assembled view of the antenna in FIG. 1 with a portion of the antenna cut out to reveal the internal structure of the antenna in a cross-sectional view.
Figure 3:
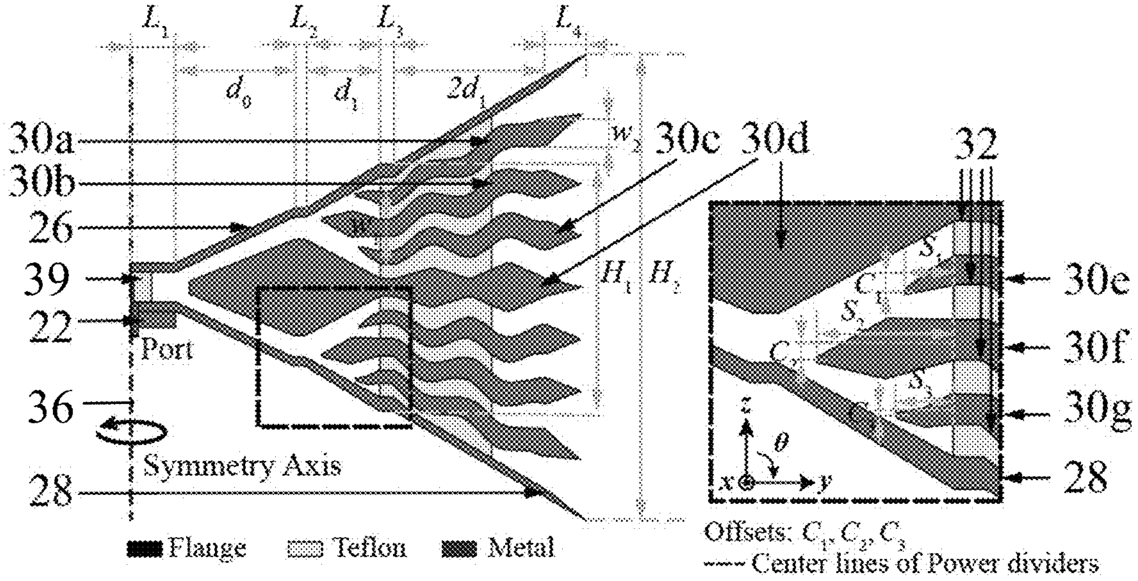
FIG. 3 is a cross-sectional view of half of the antenna in FIG. 1 in the altitude plane, together with a partial enlarged view of a power divider.

Referring now to FIGS. 1-3, the first embodiment of the present invention is a high-gain mm-wave omnidirectional biconical antenna 20. The antenna 20 is integrated with an annular phase-correction metal lens 23. As will be described in more details later, a Ka-band vertically polarized prototype of the antenna 20 was fabricated. Both its measured −10-dB impedance and 3-dB gain bandwidths are 43.9% (25.6-40.0 GHz), within which the SLL is less than −12 dB. The antenna 20 has the maximum measured gain given by 9.2 dBi, with a sharp 3-dB beamwidth of about 9° in the elevation plane. As compared with conventional biconical antennas, the antenna 20 may obtain a higher gain by ~4 dB across the entire impedance passband. The bandwidth of the antenna 20 may cover the spectrums of n257 (26.5-29.5 GHz), n258 (24.25-27.5 GHz), n260 (37-40 GHz), and n261 (27.5-28.35 GHz).

FIG. 1 is an exploded view of the antenna 20, and one can see that the antenna 20 contains three major parts which are a biconical structure 21, the annular metal lens 23, and a holding ring structure 25. Each of the biconical structure 21, the annular metal lens 23, and a holding ring structure 25 is rotational-symmetric around a rotational axis. When assembled, the biconical structure 21, the annular metal lens 23, and the holding ring structure 25 make up the antenna 20 in a compact form as shown in FIGS. 2-3, and the biconical structure 21, the annular metal lens 23, and the holding ring structure 25 are concentrically positioned about a rotational axis 36 that extends in the z direction (see FIG. 3). It should be noted that although the terms of the annular metal lens 23 and the holding ring structure 25 are used, each of the annular metal lens 23 and the holding ring structure in fact contains multiple separate parts that are disconnected from each other, but are secured in position because of the way the biconical structure 21, the annular metal lens 23, and the holding ring structure 25 are assembled, as will be described in more details below.

The biconical structure 21 which has the appearance of a conventional biconical antenna defines the contour of the antenna 20. In particular, the biconical structure 21 includes a first funnel-shaped plate 26 that has a wide end 26*b* and a narrow end 26*a* (which are shown in FIG. 2) due to the funnel shape, as well as a second funnel-shaped plate 28 that similarly has a wide end 28*b* and a narrow end 28*a*. The second funnel-shaped plate 28 is inversely positioned relative to the first funnel-shaped plate 26, such that the narrow end 28*a* of the second funnel-shaped plate 28 and the narrow end 26*a* of the first funnel-shaped plate 26 point to each other along the z direction. On the other hand, the second funnel-shaped plate 28 and the first funnel-shaped plate 26 are concentric in the biconical structure 21, and they are connected at their narrow ends 26*a*, 28*a* by a coaxial probe 22. The coaxial probe 22 is surrounded by a dielectric material 39 for example Teflon™. The biconical structure 21 and in turn the antenna 20 is excited by the coaxial probe 22 at the center of the second-funnel shaped plate 28. The coaxial feeding to the biconical structure 21 is well-known to skilled persons in the art and will not be described in any further details. The second funnel-shaped plate 28 and the first funnel-shaped plate 26 are made of metal.

The second funnel-shaped plate 28 and the first funnel-shaped plate 26 diverge from each other in the altitude plane along a direction away from a center of the antenna 20 (not shown) which is defined as a middle point on the rotational axis 36 between the narrow ends 26*a*, 28*a*. The altitude plane is defined as the plane(s) that crosses the antenna 20 to give a view of the structure in FIG. 3 and in which the rotational axis 36 is contained. An azimuth plane is defined as the plane perpendicular to both the altitude plane and the rotational axis 36. Because of the second funnel-shaped plate 28 and the first funnel-shaped plate 26 diverging from each other from the center of the antenna 20, there is a cavity formed in the biconical structure 21 that becomes larger in the x and y directions in FIG. 3, that is along all directions in the azimuth plane as it goes away from the center of the antenna 20. The annular metal lens 23 and the holding ring structure 25 are substantially received in the cavity when the antenna 20 is assembled, as shown in FIG. 2. In other words, the annular metal lens 23 is delimited by the second funnel-shaped plate 28 and the first funnel-shaped plate 26.

As shown in FIGS. 1-3, in each of the second funnel-shaped plate 28 and the first funnel-shaped plate 26, there are multiple flat portions 26*c* and 28*c* that are located in virtual planes parallel to the azimuth plane. Each of the flat portions 26*c*, 28*c* has an annular shape. As best shown in FIG. 3, and as an example, one flat portion 28*c* of the second funnel-shaped plate 28 is located between and connected by two ramp portions. The other flat portion 28*c* and the flat portions 26*c* of the first funnel-shaped plate 26 have similar configurations to the flat portion 28*c* shown in the partial enlarged view in FIG. 3. The flat portions 26*c* of the first funnel-shaped plate 26 are parallel to each other, but are offset from each other in both the horizontal direction and the vertical direction as shown in the altitude plane in FIG. 3. The same spatial relationship applies to the flat portions 28*c* of the second funnel-shaped plate 28.

The annular metal lens 23 as mentioned above contains a plurality of annular metal plates (MPs) which are disconnected from each other. In particular, as shown in FIGS. 2-3 there are seven annular metal plates 30*a*, 30*b*, 30*c*, 30*d*, 30*e*, 30*f*, 30*g* which are concentrically arranged with and located between the second funnel-shaped plate 28 and the first funnel-shaped plate 26. All of the annular metal plates 30*a*-30*g* have different dimensions, but there are similarities in shapes, and in particular all annular metal plates 30*a*-30*g* have spatially curved shapes, which are defined with a sine function and a ring function in the azimuth and altitude planes, and further terminated with a wedge shape. The annular metal plates 30*a*-30*g* each have a thickness in the altitude plane (i.e. the thicknesses as shown in FIG. 3) that substantially increases along the direction away from the rotational axis 36 and toward a substantially radial direction. The substantially radial direction does not mean that the thickness change occurs entirely in the horizontal direction (i.e. x direction or y direction). Rather, as shown in FIG. 3, most notably the annular metal plates 30*a* and 30*g* as being farthest from a central plate 30*d* extends along inclined directions with respect to the rotational axis 36 and the azimuth plane, and their thicknesses increase along with their respective extension directions (in both z-x directions or z-y directions) outward from the center of the antenna 20.

Among the seven annular metal plates 30*a*-30*g* that are substantially aligned in the vertical direction in FIG. 3 (i.e. the z direction in FIG. 3), the central plate 30*d* is located in the middle, and it has the largest dimensions as compared to all other annular metal plates 30*a*-30*c* and 30*e*-30*g*. It should be noted that as shown in FIGS. 2-3, three metal plates 30*a*-30*c* are located on one side of the central plate 30*d*, and the other three metal plates 30*e*-30*g* are located on another side of the central plate 30*d*, where the metal plates 30*a*-30*c* are symmetric with the metal plates 30*e*-30*g* about the central plate 30*d*. In particular, the metal plate 30*a* is a mirrored version of the metal plate 30*g*, the metal plate 30*b* is a mirrored version of the metal plate 30*f*, and so on. The entire annular metal lens 23 thus has a symmetric structure about the azimuth plane in which the center of the antenna 20 is located. It should be noted that the second funnel-shaped plate 28 and the first funnel-shaped plate 26 are also in mirror-symmetry with each other about the central plane 30*d*. In fact, the second funnel-shaped plate 28 and the first funnel-shaped plate 26 are part of the annular metal lens structure in the antenna 20, and the second funnel-shaped plate 28 and the first funnel-shaped plate 26 together with the seven annular metal plates 30*a*-30*g* of the annular metal lens 23 form the annular metal lens structure.

As shown in FIGS. 2-3, the holding ring structure 25 includes multiple holding rings 32 that like the annular metal plates 30*a*-30*g* are disconnected from each other. There are eight holding rings 32 in the antenna 20, one less than the total number (nine) of the second funnel-shaped plate 28, the first funnel-shaped plate 26, and the annular metal plates 30*a*-30*g*, but one more than just the annular metal plates 30*a*-30*g*. It is clearly shown in FIGS. 2-3 that each holding ring 32 is sandwiched by two adjacent ones of the second funnel-shaped plate 28, the first funnel-shaped plate 26, and the annular metal plates 30*a*-30*g*. For example, one holding ring 32 is sandwiched between the first funnel-shaped plate 26 and the annular metal plate 30*a*. One can see that all the holding rings 32 are aligned in the direction defined by the rotational axis 36 (i.e. the z direction in FIG. 3), and their radial dimensions (with respect to the rotational axis 36) are substantially the same. The holding rings 32 are made from dielectric materials, and in one example all the holding rings 32 are made from Teflon with a dielectric constant of 2.1. The holding rings 32 as they are sandwiched between the second funnel-shaped plate 28, the first funnel-shaped plate 26, and the annular metal plates 30*a*-30*g* therefore allow the assembly of the antenna 20 to be made with stability, and locate the annular metal plates 30*a*-30*g* accurately without displacements.

In one preferred embodiment, both the annular metal plates 30*a*-30*g* and the holding rings 32 are fabricated using the computer numerical control (CNC) machining. Table I below lists the optimized simulation parameters in running the HFSS (High Frequency Structure Simulator), with maximum delta S and minimum converged passes being equal to 0.02 and 2, respectively.

TABLE I

PARAMETERS OF PROPOSED OMNIDIRECTIONAL ANTENNA (ANT. III)

| $L_1$ | $L_2$ | $L_3$ | $L_4$ | $h_1$ | $h_2$ |
|---|---|---|---|---|---|
| 5 mm | 1 mm | 1.5 mm | 4 mm | 28.5 mm | 53.7 mm |
| $d_0$ | $d_1$ | d | $S_1$ | $S_2$ | $S_3$ |
| 14 mm | 8.8 mm | 17.7 mm | 2.5 mm | 6.8 mm | 3 mm |
| $C_1$ | $C_2$ | $C_3$ | $w_1$ | $w_2$ | |
| 1.2 mm | 1 mm | 0.5 mm | 1 mm | 3.5 mm | |

Figure 4A:
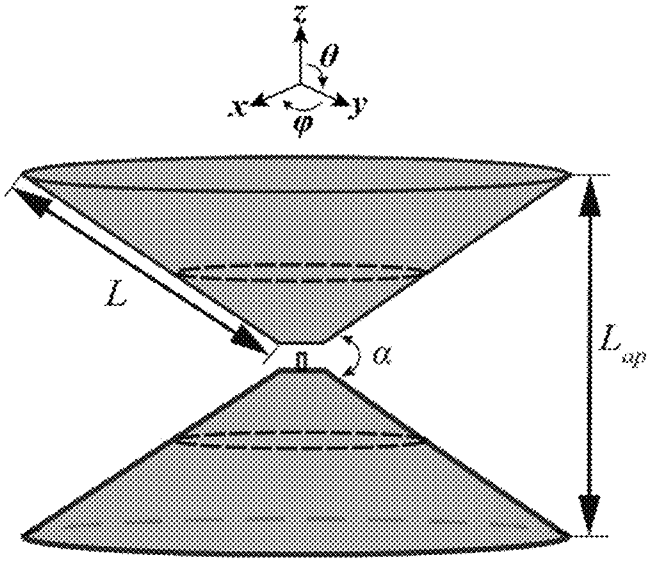
Fig. 4a (prior art)
FIG. 4*a* shows a conventional biconical antenna.
Figure 4B:
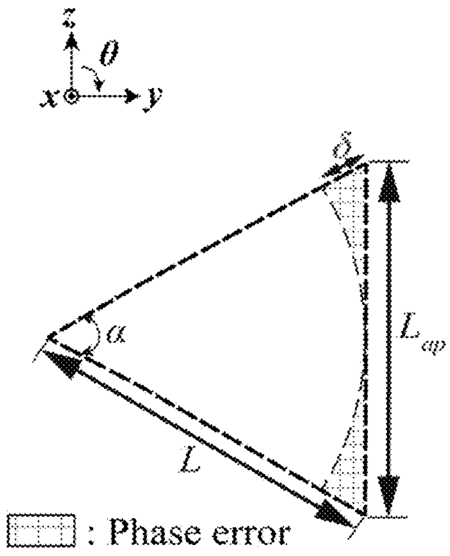
FIG. 4*b* is a schematic diagram of phase error of the conventional biconical antenna in FIG. 4*a*.
Figure 5:
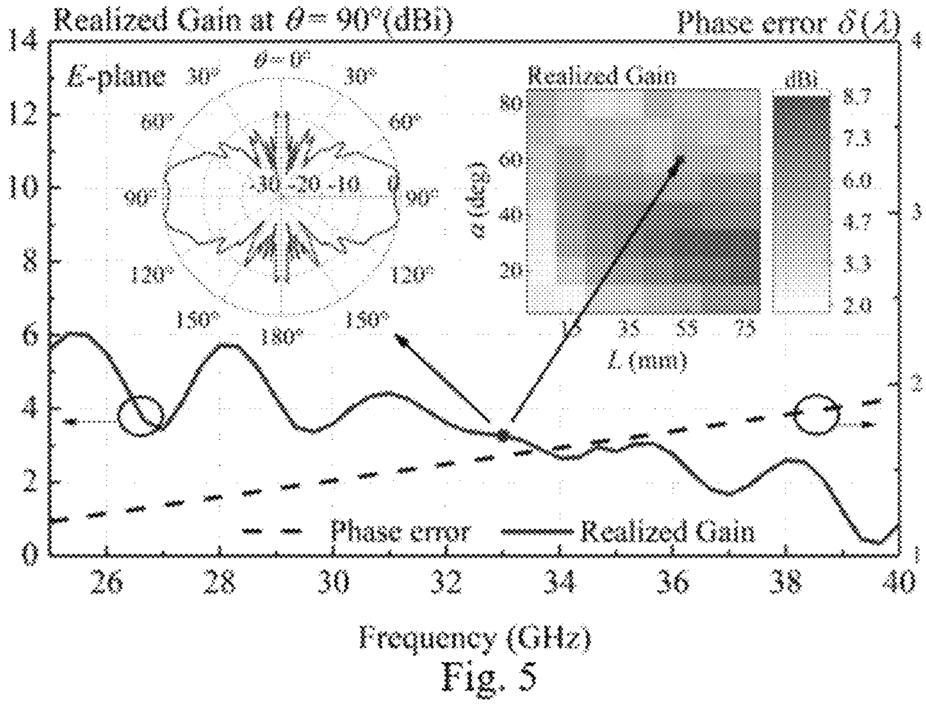
FIG. 5 shows simulated realized gain of the conventional biconical antenna in FIG. 4*a* with the parameters of L=53.7 mm, $\alpha$=60°, and $\lambda$ is the wavelength in air.

The design theory of the antenna 20 will now be described. To begin with, a reference conventional biconical antenna was simulated for comparisons of the antenna gain and radiation pattern. FIG. 4*a* shows a conventional biconical antenna as the reference antenna. The antenna length L and flare angle α determine its performance. In general, a large radiating aperture with a uniform distribution can give a high gain antenna. The aperture length $L_{ap}=2L\sin(\alpha/2)$ increases with an increase in its flare angle α if fixing the antenna length L. Meanwhile, however, the phase error $\delta=L\cdot(\sec(\alpha/2)-1)$ as easily evaluated from FIG. 4*b* will also increase. As can be observed from FIG. 5, the antenna gain generally deteriorates as δ increases.

Figure 6:
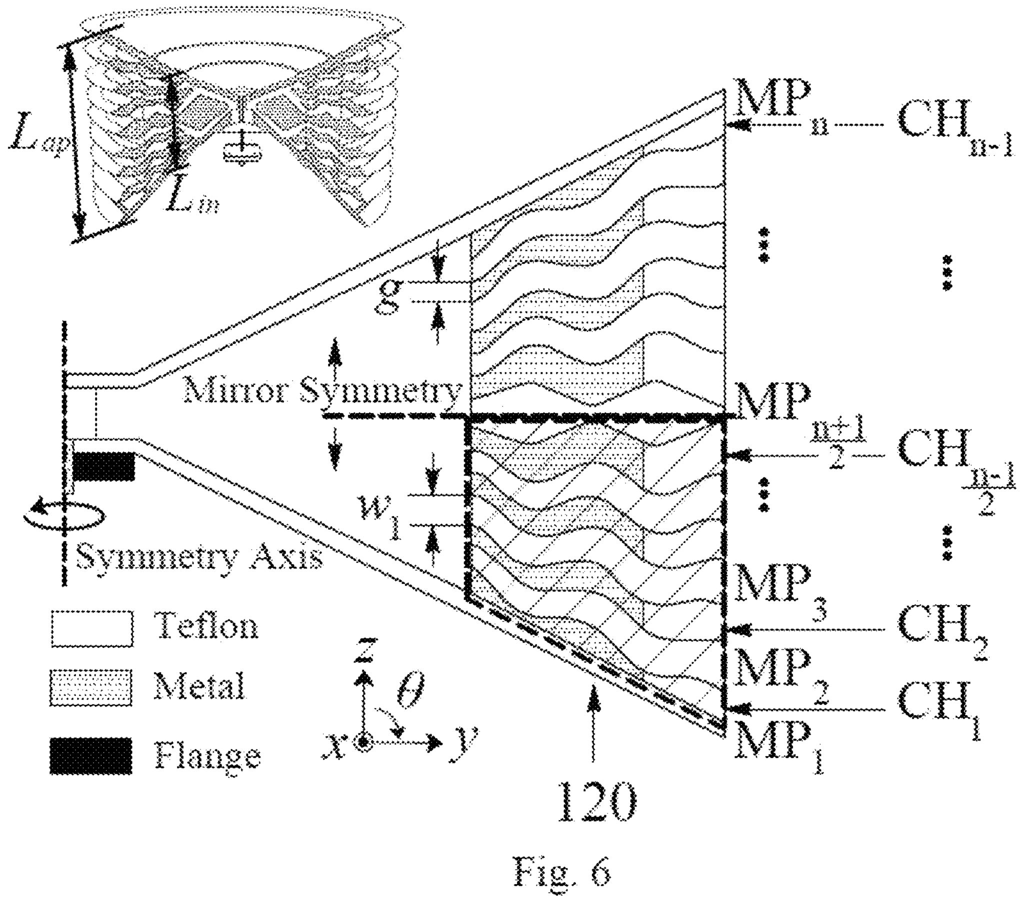
FIG. 6 shows cross-sectional views of an omnidirectional biconical antenna according to another embodiment of the invention.

Turning to the design of the annular metal lens, FIG. 6 shows an omnidirectional biconical antenna 120 according to another embodiment of the invention, which has an internal structure simpler than that in FIGS. 1-3. FIG. 6 zooms in the half cross-sectional view of the omnidirectional antenna 120 because of its rotational symmetry similar to the antenna in FIGS. 1-3. A metal lens in the antenna 120 consists of n annular spatially curved equal-path-length metal plates, where n is the (odd) number of the metal plates including the top and bottom plates of the biconical antenna 120. The Teflon rings are used for the correct locations of the two adjacent metal plates.

Figure 7:
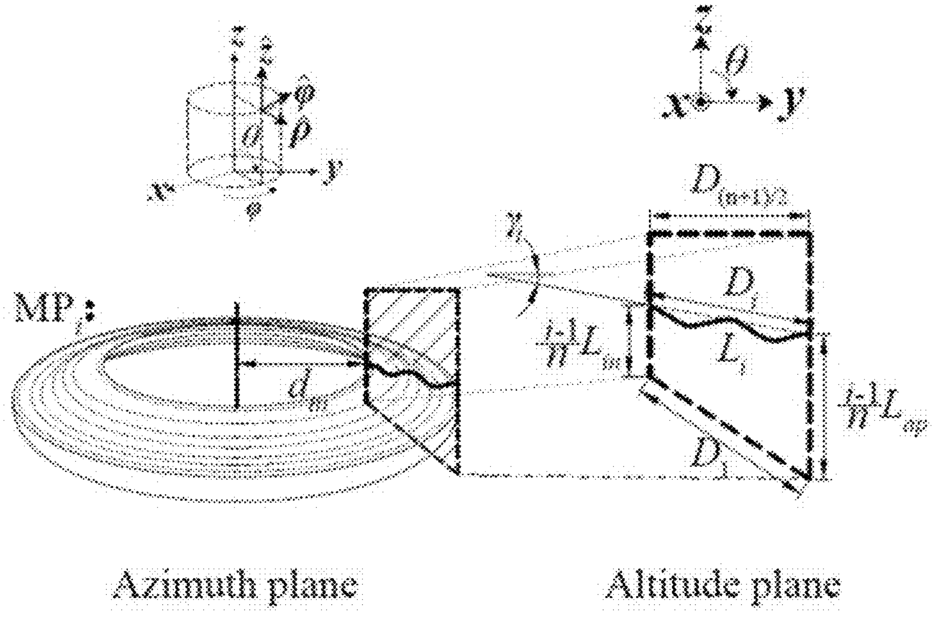
FIG. 7 shows a metal plate of an annular metal lens according to another embodiment of the invention, including a cross-sectional dimension diagram in the latitude plane.

For the annular metal lens used in embodiments of the invention, the electromagnetic (EM) wave can propagate in a channel (CH) created by two adjacent metal plates among annular metal plates. Due to the rotational symmetry, a good omnidirectional radiation pattern can be obtained. FIG. 7 shows one of the annular metal plates in an annular metal lens according to one embodiment of the invention, which is designated by $MP_i$ without loss of generality. The shape of the annular metal plate in FIG. 7 can be described by a sine function $F_i(\rho, z)$ and a ring function $R_i(\rho, \phi)$ in the altitude and azimuth planes, respectively. In FIGS. 6-7, the following abbreviations are used: CH: channel; n: odd number representing the number of metal plates including top and bottom plates of a biconical antenna; i: an arbitrary metal plate; $D_i$: direct distance between the endpoints; $L_i$: length of the metal plate; $\gamma_i$: angle between $MP_i$ and the y-axis; g: channel (or Teflon) width; $w_1$: MP width; $L_{in}$: lens input size; $L_{ap}$: lens output size; $d_{in}$: distance between the starting endpoint and the center.)

For the annular metal plate in FIG. 7, in the altitude plane, $$F_i(\rho, z) = a_i\cos\left(4\pi\frac{\rho}{D_i}\right) + \left(1 + \frac{w_2 - w_1}{w_1}\frac{\rho}{D_i}\right)\cdot z \tag{1}$$

$$\text{where } \rho \in [0, D_i],\ z \in [0, w_1]$$

$$R_i(\rho, \phi) = d_{in} + \rho \tag{2}$$

$$\text{where } \rho \in [0, d],\ \phi \in [0, 2\pi]$$

and in the azimuth plane, $$R_i(\rho, \phi)=d_{in}+\rho$$

$$\text{where } \rho\in[0, d], \phi\in[0,2\pi] \tag{2}$$

where $\alpha_i$ and $D_i$ are the maximum amplitude and direct distance between two endpoints of $MP_i$ (i.e., direct length of $MP_i$), respectively. The length d of the lens is given by the direct length of the middle MP, i.e., $d=D_{(n+1)/2}$, whereas the length $L_i$ of $MP_i$ is given by $$L_i = \int_0^{D_i}\sqrt{1 + \left(\frac{\partial[F_i(\rho, z)]}{\partial\rho}\right)^2}\,d\rho \tag{3}$$

It is worth mentioning that the metal lens shown in FIGS. 6-7 can enhance antenna gain by reducing the phase error. A phase error is generated from the physical geometry of the radiators. If the MPs were flat, their lengths would be decided by the two endpoints only, and the phase error would still exist due to the different lengths of the MPs. In embodiments of the invention, curved MPs are used to make their lengths equal. As a result, the phase delay in each CH is the same, effectively decreasing the phase error. Here, the sinusoidal shape has been chosen for the demonstration, but in variations of the embodiments of the invention, other shapes of MPs can also be used.

Figure 8A:
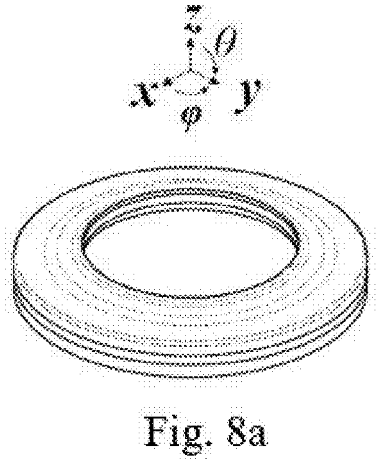
FIG. 8*a* is a perspective view of annular parallel-plate waveguide formed by two adjacent metal plates according to another embodiment of the invention.
Figure 8B:
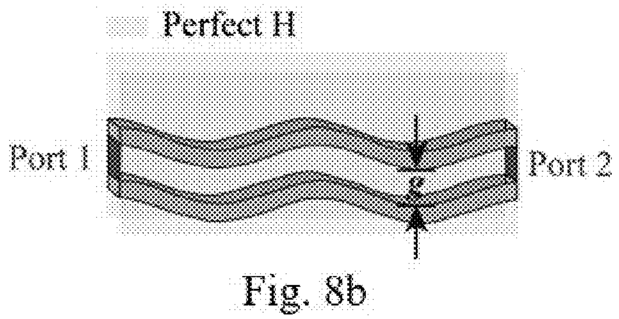
FIG. 8*b* shows an equivalent model of the annular parallel-plate waveguide in FIG. 8*a* for simulation purposes.
Figure 8C:
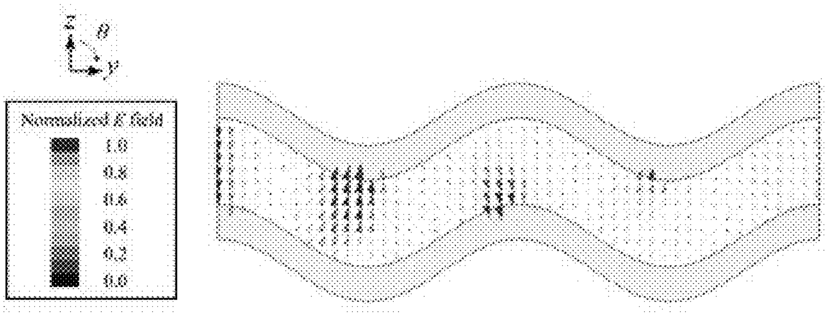
FIG. 8*c* shows a normalized simulated E-field distribution of the equivalent model in FIG. 8*b* at 33 GHz.
Figure 8D:
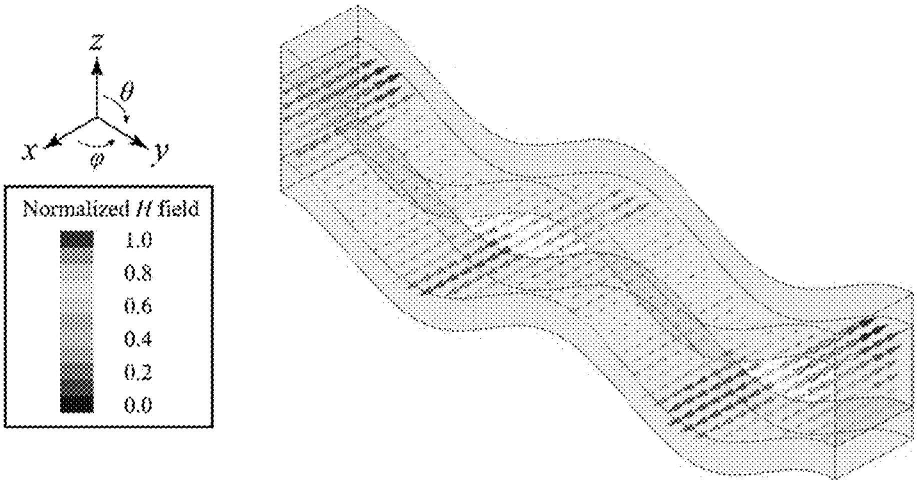
FIG. 8*d* shows a normalized simulated H-field distribution of the equivalent model in FIG. 8*b* at 33 GHz.

Turning to FIG. 8*a*, which shows a perspective view of a curved annular parallel-plate waveguide formed by two adjacent MPs according to another embodiment of the invention. This curved parallel-plate waveguide can be considered as the unit cell of an annular metal lens. FIG. 8*b* shows a simple equivalent model for the purpose of simulation, whereas FIG. 8*c* and FIG. 8*d* show that the propagating orthogonal E- and H-fields inside the curved waveguide are perpendicular to the propagation direction including the bending parts. In other words, all channels support a TEM wave, and therefore the phase delays of the different channels will be the same if the channels have the same physical length. Also, the TEM mode ensures the purity of the aperture E-field, which is needed to suppress the undesirable cross-polar field.

Figure 9A:
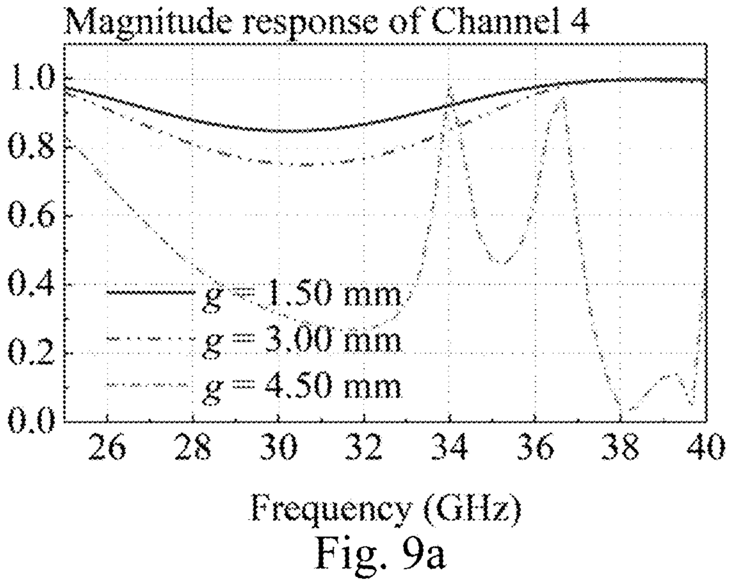
FIG. 9*a* illustrates the magnitude response of a simulated transmission of Channel 4 in the annular metal lens in FIG. 6 with different gap sizes.
Figure 9B:
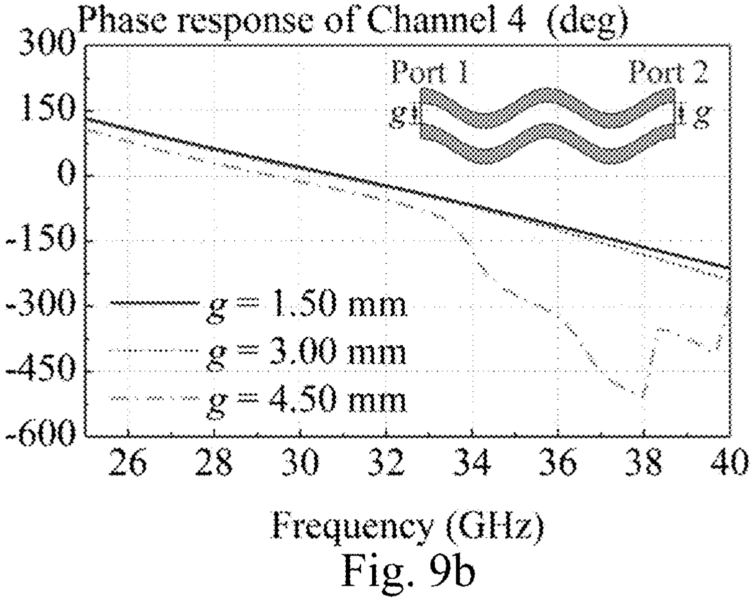
FIG. 9*b* illustrates the phase response of a simulated transmission of Channel 4 in the annular metal lens in FIG. 6 with different gap sizes.
Figure 10A:
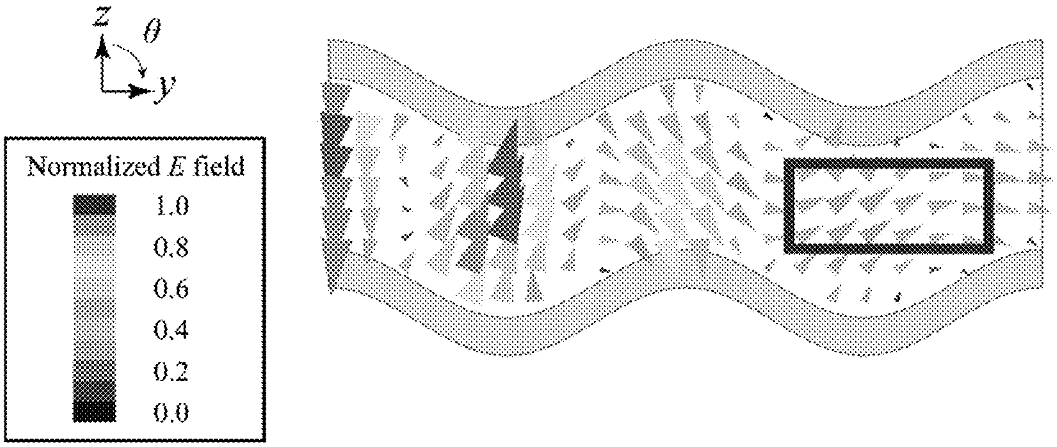
FIG. 10*a* illustrates the E-field distribution of simulated results of Channel 4 in the annular metal lens in FIG. 6 with g=4.5 mm at 33 GHz.
Figure 10B:
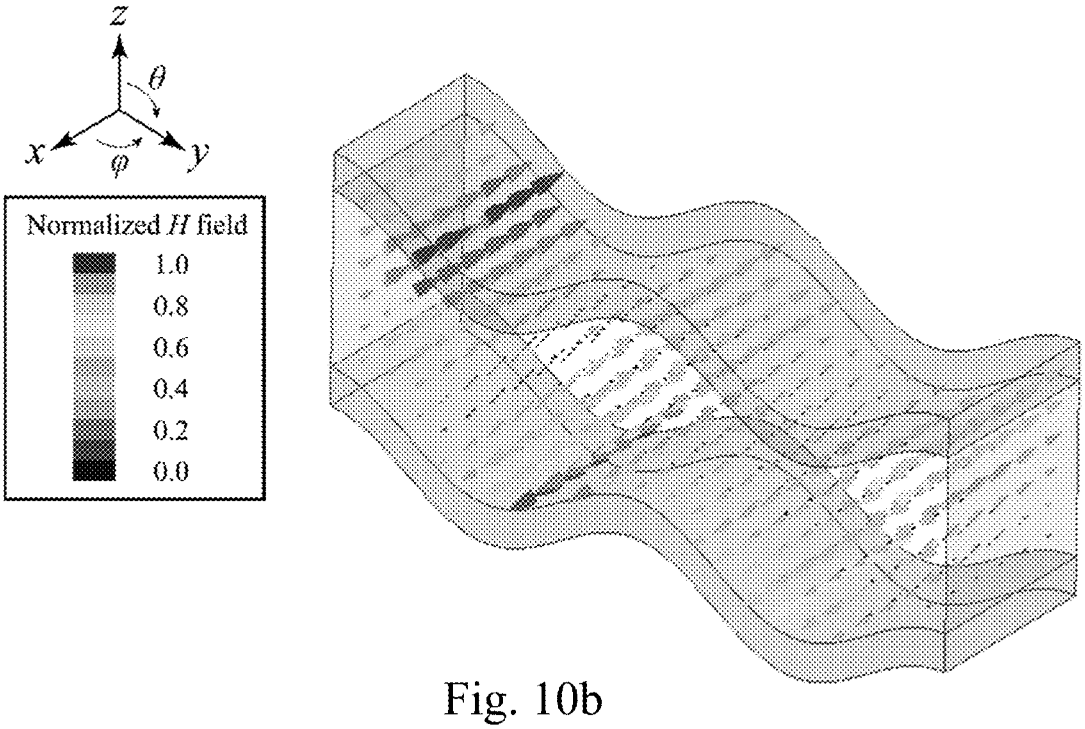
FIG. 10*b* illustrates the H-field distribution of simulated results of Channel 4 in the annular metal lens in FIG. 6 with g=4.5 mm at 33 GHz.

With reference to FIG. 8*b*, the distance between the upper and lower waveguide plates is denoted by g, which determines the separation between the two MPs. The fabrication can be difficult if g is very small. However, if g is not small enough, a $TM_1$-mode wave can be excited, leading to a wave dispersion as shown in FIGS. 9*a* and 9*b*. A metal lens with n=9 is arbitrarily considered for illustration. The middle channels ($CH_4$ and $CH_5$) are chosen for the illustration because they have the largest curvature (the results of $CH_4$ and $CH_5$ are the same by symmetry). FIGS. 10*a* and 10*b* illustrate the dispersion effect by showing the simulated E- and H-field distributions at 33 GHz with an oversized g of 4.5 mm. With reference to the bolded rectangle in FIG. 10*a*, the E-field can be parallel to the propagation direction because of the higher-order $TM_1$ mode. The cutoff frequency of the $TM_m$ mode is given by [31]

$$f_c = \frac{m}{2g\sqrt{\mu\epsilon}} m = 0, 1, 2, 3 \ldots \tag{4}$$

when g=4.54 mm and m=1, it can be calculated from (4) that the cutoff frequency is 33 GHz. Therefore, both the phase and magnitude responses of $CH_4$ and $CH_5$ will deteriorate when g≥4.50 mm. With reference to FIGS. 9*a* and 9*b*, good magnitude and phase responses can be obtained when g≤3 mm.

Figure 11:
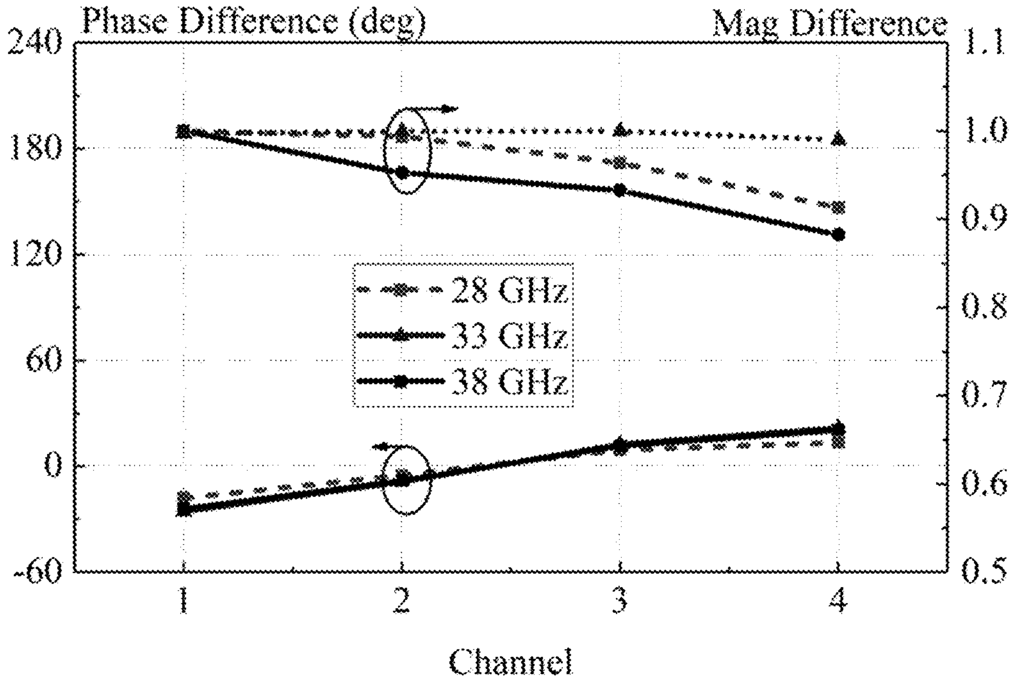
FIG. 11 depicts normalized phase and magnitude responses of different channels in the annular metal lens in FIG. 6, at 28, 33, and 38 GHz.

FIG. 11 shows the normalized magnitude and phase responses of $CH_1$-$CH_4$ of the antenna 120 at 28, 33, and 38 GHz. Due to geometrical symmetry, only half channels are shown. It can be seen from the figure that the overall magnitude and phase variations are less than 0.87 and 30°, respectively. Therefore, the designed annular metal lens in FIG. 6 has a wide phase-correcting and gain-enhancing bandwidth.

Figure 12:
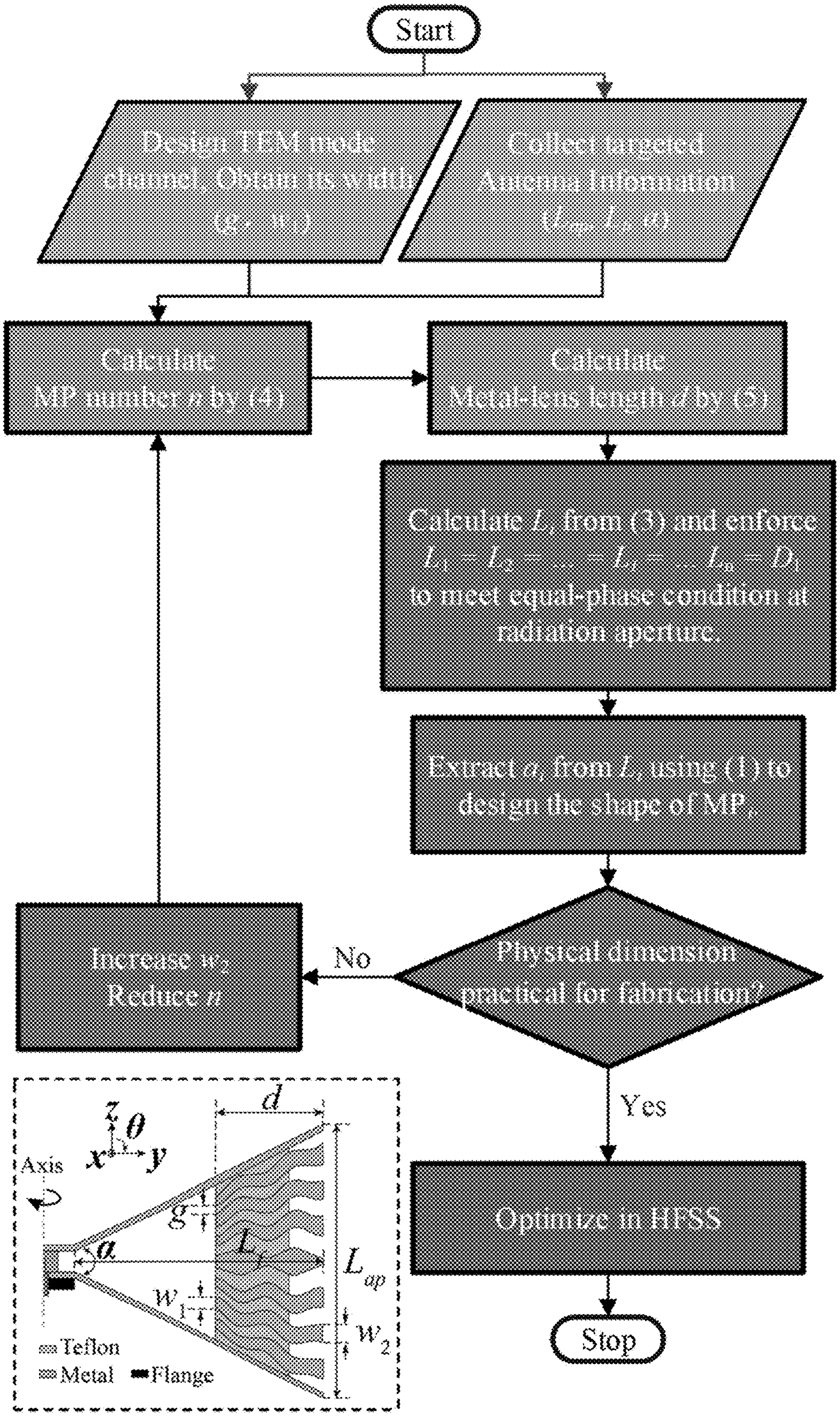
FIG. 12 is a flowchart showing the design procedures of an annular metal lens according to another embodiment of the invention.

Next, the design guideline for the annular metal lens will be explained. FIG. 12 presents the design flowchart of the annular metal lens. To begin with, a curved CH that only supports the TEM wave inside is designed. In this step, the geometric information of the targeted antenna should be collected, such as the aperture size ($L_{ap}$), axial length ($L_f$), and flare angle (α).

The number (n) of MPs and the metal lens length (d) are calculated by $$n = \frac{L_{ap} + g}{w_1 + g} \tag{5}$$

$$d = \frac{L_{ap} - nw_1 - (n-1)g}{2\tan\frac{\alpha}{2}} \tag{6}$$

where g and $w_1$ are the CH and MP widths at the input aperture of the metal lens, respectively (see the inset in FIG. 12).

Next, the parameter $\alpha_i$ that controls the channel length $L_i$ is extracted and iterated until each plate length is equal to $D_1$. If g is larger than the minimum size of the Teflon holding rings that can be fabricated, the design of the metal lens will be done. The following step is to design and optimize the power divider and impedance match with HFSS. But if the minimum size of the Teflon holding rings is not met, the ending width ($w_2$) of the MPs should be increased whereas n should be reduced to make the fabrication practical. The process will be iterated using (5) and (6). If the width of MPs is very thin, there will be a large number of channels to give an in-phase distribution at the radiating aperture to enhance antenna gain. In this case, the designed metal lens will be frequency-insensitive because the different channels will have the same phase delay, giving a wideband lens that enhances the antenna gain.

However, considering the practical fabrication issues and the polarization purity of the E-field, the proposed metal lens was designed to have nine MPs, with $w_1$=1 mm, $w_2$=3.5 mm. Since the structure is mirror-symmetric, there are four pairs of channels, with each channel formed by two adjacent MPs. Table II lists the different amplitudes of the sinuous-shaped MPs.

TABLE II

THE AMPLITUDES OF SINUOUS FUNCTIONS FOR VARIOUS METAL PLATE SHAPES

| MP | 1, 9 | 2, 8 | 3, 7 | 4, 6 | 5 |
|---|---|---|---|---|---|
| $a_i$ | 0 | 0.66 | 0.8 | 0.9 | 1.0 |

Figure 13:
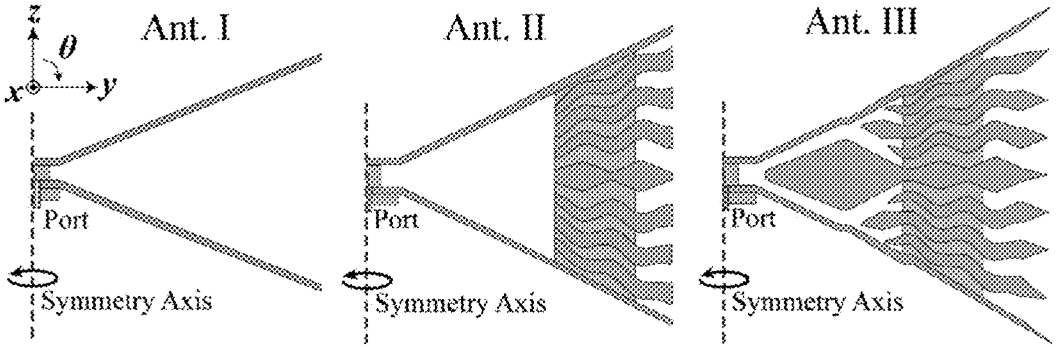
FIG. 13 illustrates a design evolution from Ant. I (the conventional biconical antenna in FIG. 4*a*), Ant. II (the omnidirectional biconical antenna in FIG. 6), to Ant. III (the antenna in FIGS. 1-3).

FIG. 13 shows the design evolution of according an embodiment of the invention. In FIG. 13, Ant. I is the conventional biconical antenna in FIG. 4*a*. Ant. II is the antenna in FIG. 6 which is obtained by loading Ant. I with an annular metal lens. Finally, Ant. III is obtained by adding a power-divider network and a metallic wedge for each MP to improve impedance match. For fair comparison, all the three antennas have the same aperture size and flare angle.

Figure 14:
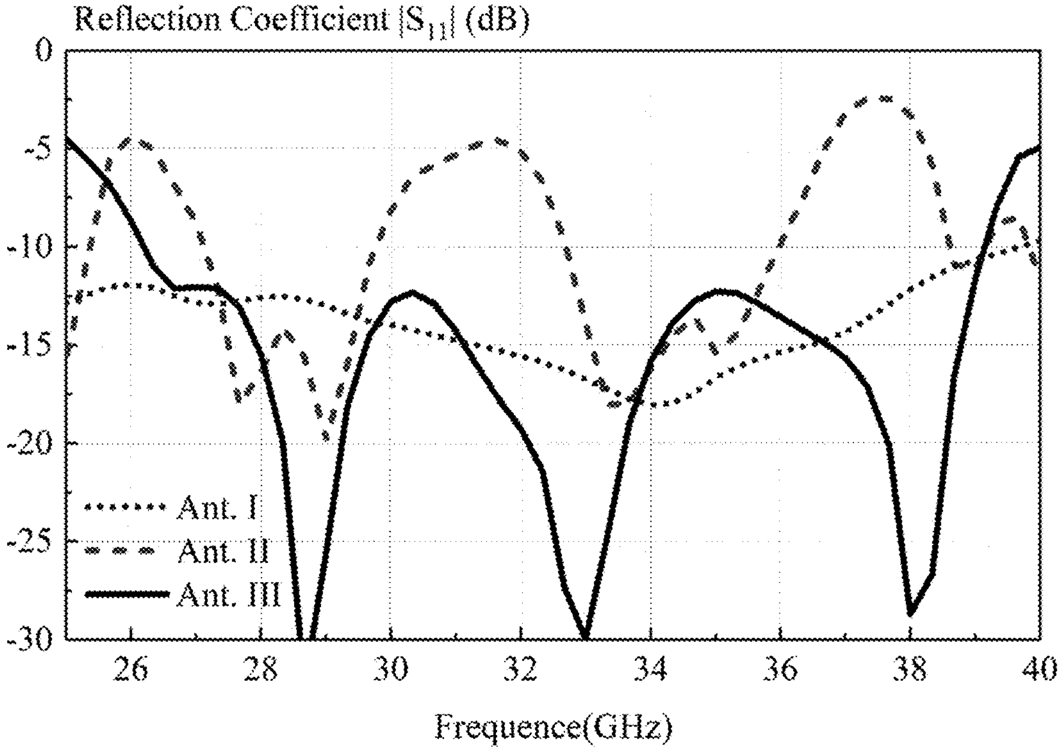
FIG. 14 shows simulated reflection coefficients of Ant. I, Ant. II, and Ant. III.

FIG. 14 shows the simulated reflection coefficients $|S_{11}|$ of Ants. I, II, and III. As can be observed from FIG. 10, Ant. I has a −10-dB impedance bandwidth of 45%. However, Ant. II has a much narrower −10-dB impedance bandwidth of 9.0% (32.8-35.9 GHz) due to the loading of the annular metal lens. This problem is solved in Ant. III after adding the metallic matching wedges and the power-divider network; its impedance bandwidth has been substantially increased from 9% to 39.6% (26.2-39.1 GHz).

Figure 15A:
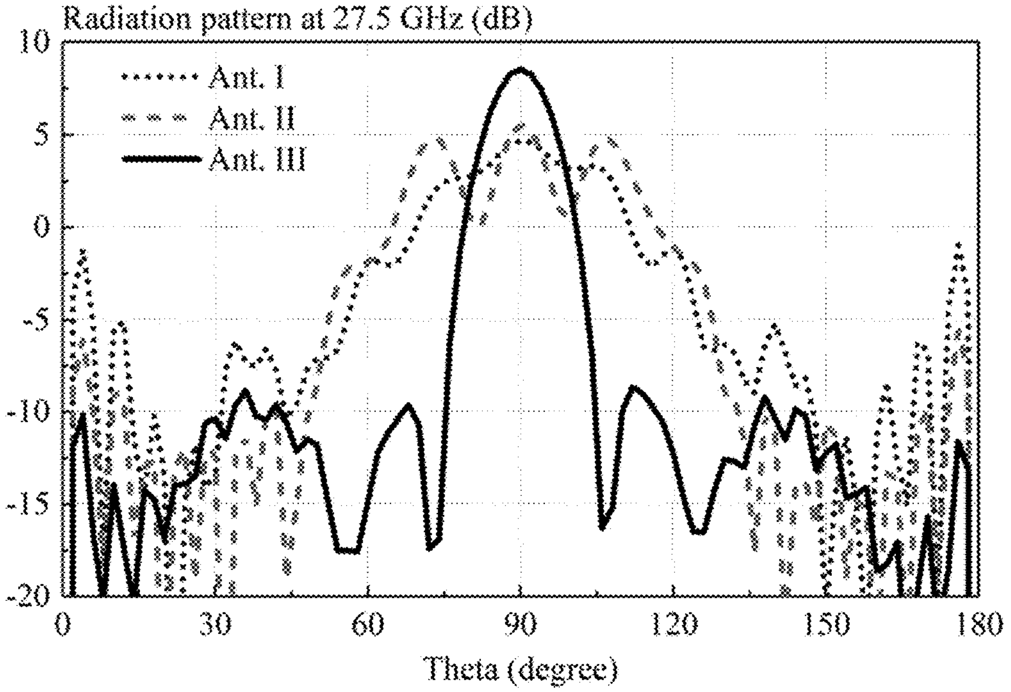
FIG. 15*a* illustrates the simulated radiation pattern of Ant. I, Ant. II, and Ant. III in the E-plane at 27.5 GHz.
Figure 15B:
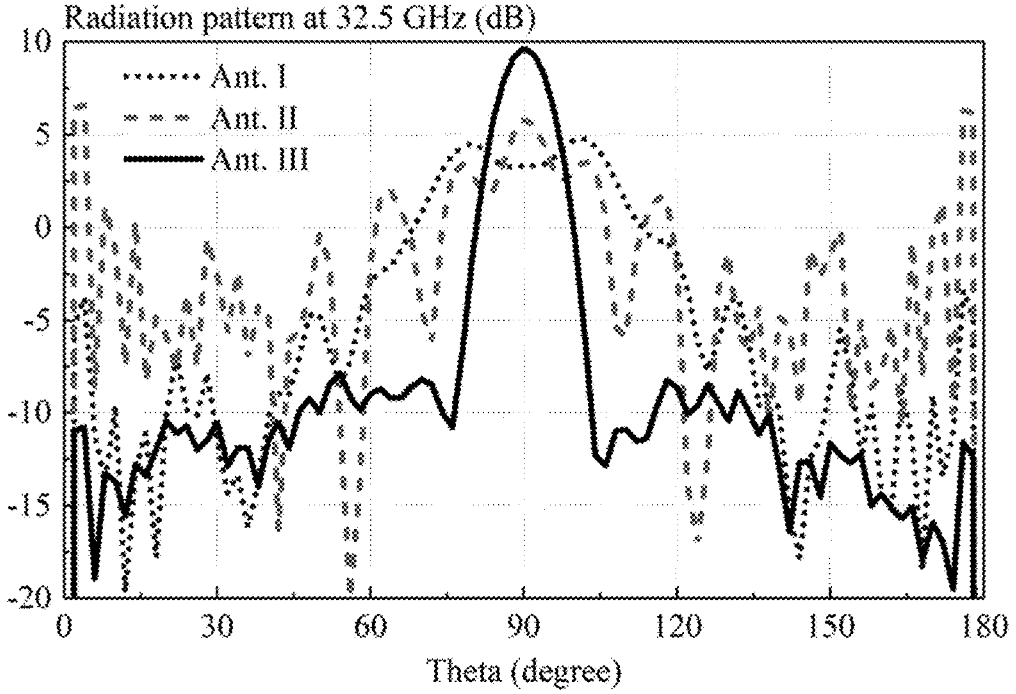
FIG. 15*b* illustrates the simulated radiation pattern of Ant. I, Ant. II, and Ant. III in the E-plane at 32.5 GHz.
Figure 15C:
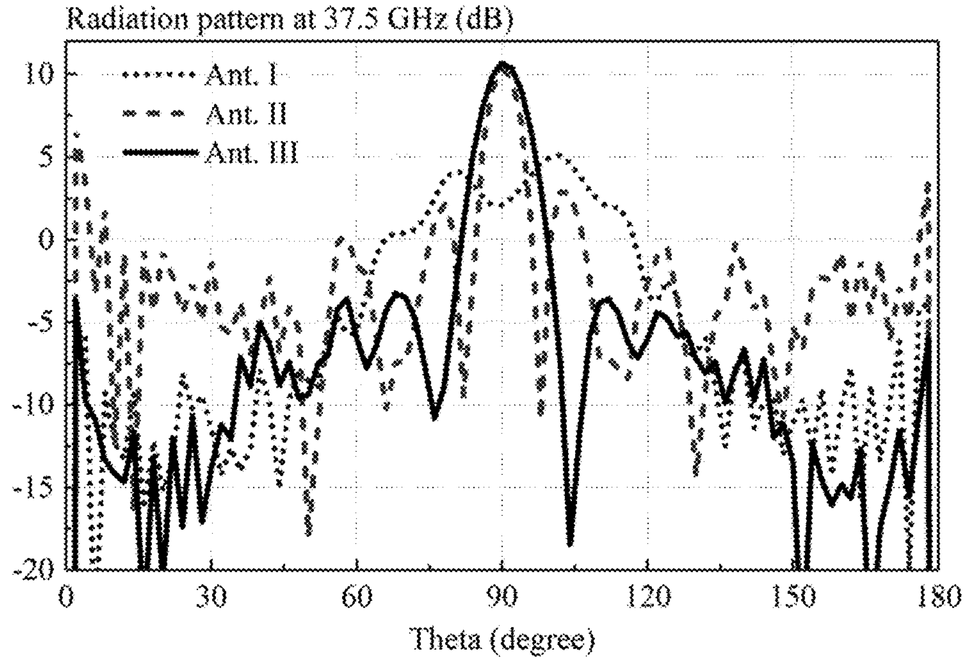
FIG. 15*c* illustrates the simulated radiation pattern of Ant. I, Ant. II, and Ant. III in the E-plane at 37.5 GHz.

FIGS. 15*a*-15*c* show the radiation patterns of the three antennas Ant. I, Ant. II and Ant. III at 27.5, 32.5, and 37.5 GHz. Since the antennas are all rotationally symmetric, only half of the E-plane radiation (directional) patterns are shown for comparison. The H-plane (omnidirectional) radiation patterns, however, are not shown here because their differences are not significant. With reference to FIGS. 15*a*-15*c*, as compared with Ant. I, Ant. II has enhanced the gain at θ=90° by 1-2 dB at 27.5 GHz and 32.5 GHz, and the enhancement increases to more than 7 dB at 37.5 GHz. However, two side-lobes are undesirably generated at θ=2° and 178°. This side-lobe problem is also solved in Ant. III, which has a much better SLL of about −15 dB. As a result, Ant. III is a most preferred design (hereinafter "the proposed antenna") among Ant. I, Ant. II and Ant. III.

Figure 16:
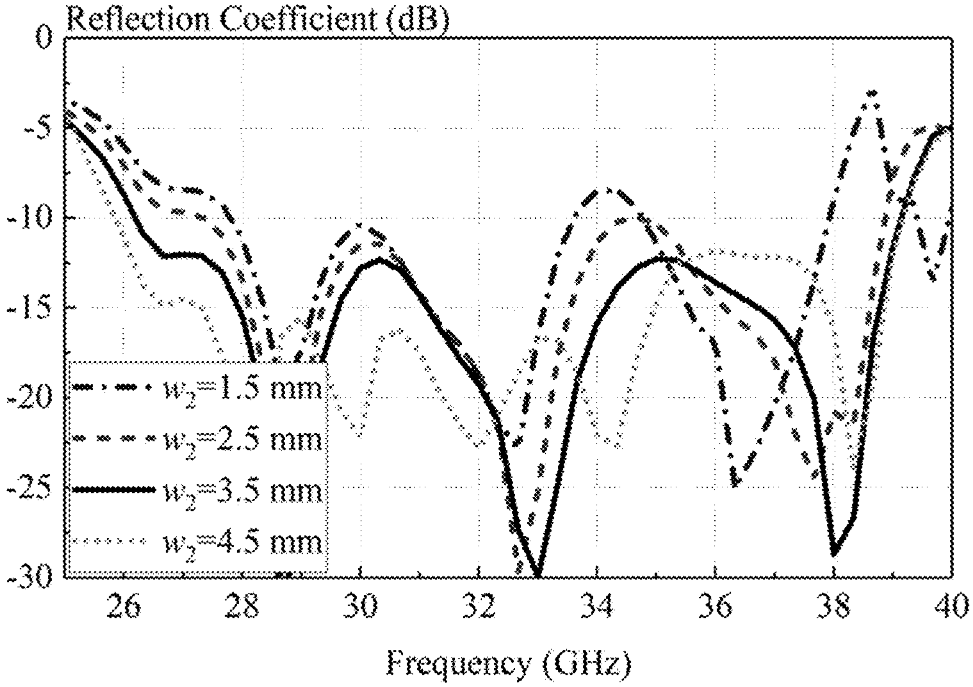
FIG. 16 illustrates simulated reflection coefficients of Ant. III with different widths of $w_2$=1.5, 2.5, 3.5, and 4.5 mm.

A parametric study was carried out to characterize Ant. III. In the parametric study, only the MP ending width ($w_2$) was changed, with other parameters being the same as given in Table I. FIG. 16 shows the reflection coefficients at various MP ending widths of $w_2$=1.5, 2.5, 3.5, and 4.5 mm. It can be seen from FIG. 16 that the impedance passband increases with an increase in $w_2$. This phenomenon can be expected because the reflection coefficient is inversely proportional to the channel width g as shown in FIGS. 9*a*-9*b*.

Figure 17A:
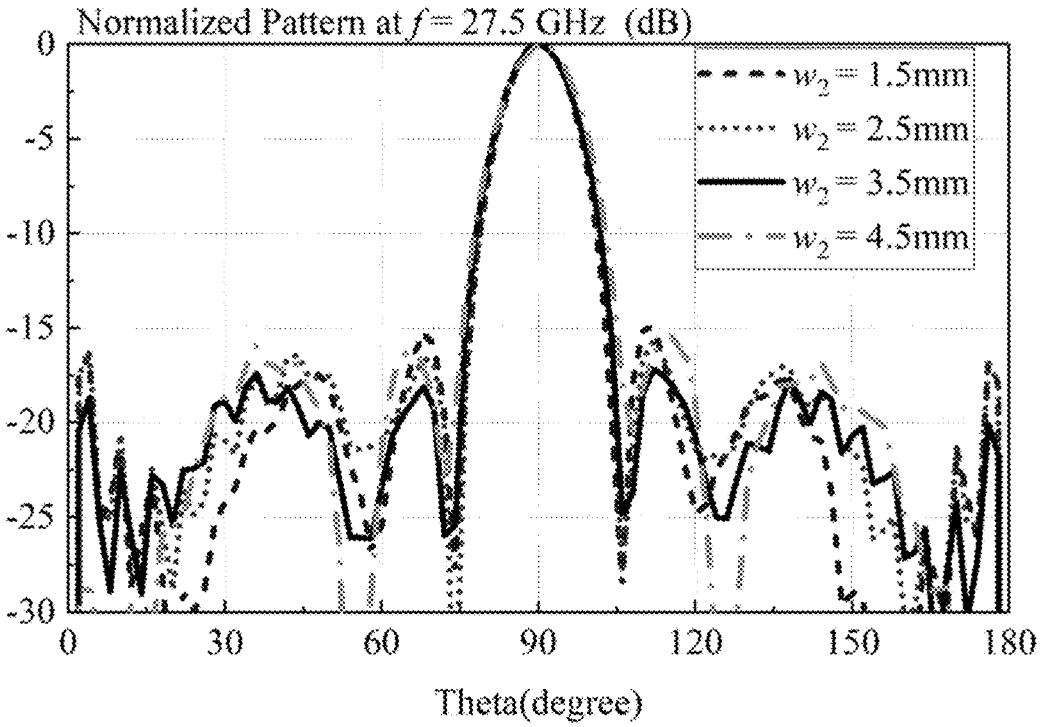
FIG. 17*a* illustrates a normalized radiation pattern of Ant. III with different widths of $w_2$=1.5, 2.5, 3.5 and 4.5 mm at 27.5 GHz.
Figure 17B:
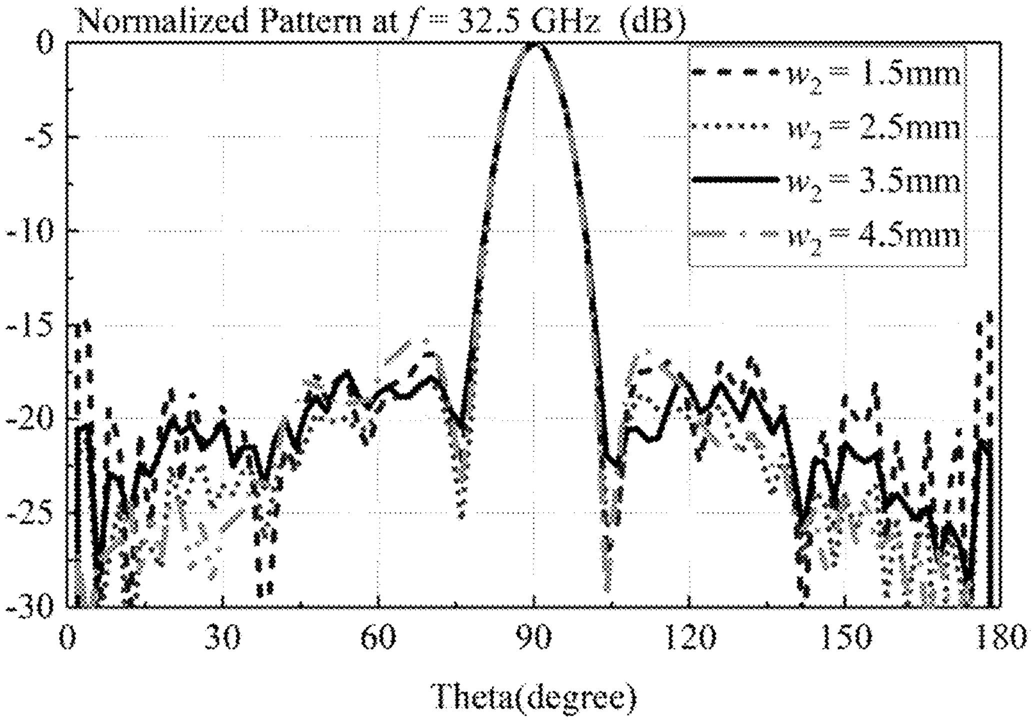
FIG. 17*b* illustrates a normalized radiation pattern of Ant. III with different widths of $w_2$=1.5, 2.5, 3.5 and 4.5 mm at 32.5 GHz.
Figure 17C:
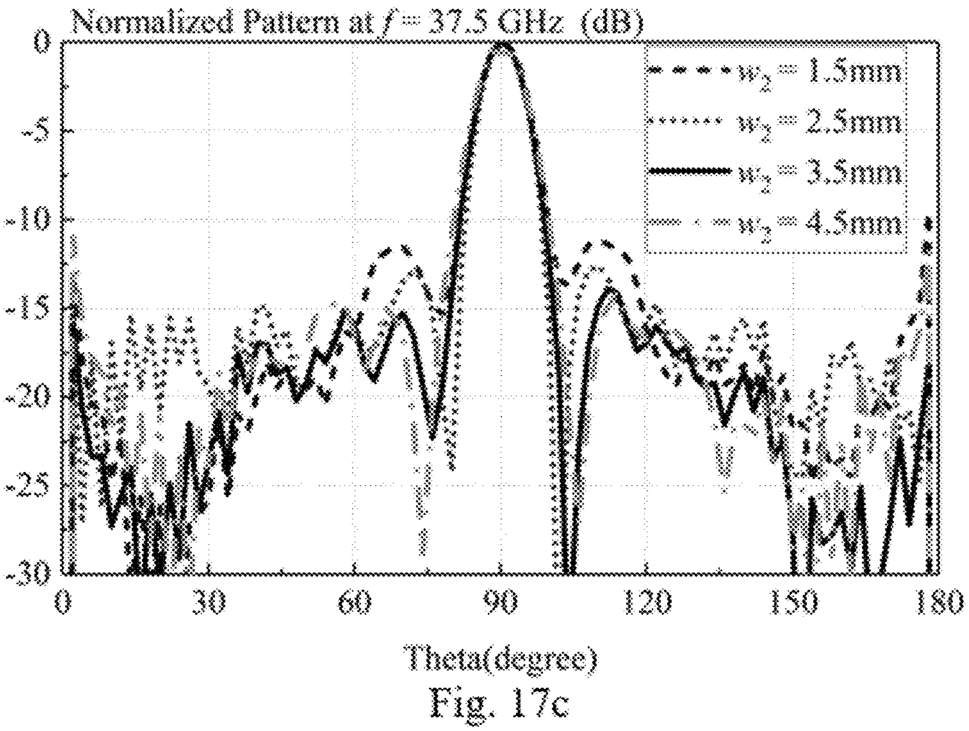
FIG. 17*c* illustrates a normalized radiation pattern of Ant. III with different widths of $w_2$=1.5, 2.5, 3.5 and 4.5 mm at 37.5 GHz.

FIGS. 17*a*-17*c* show the normalized radiation pattern of Ant. III with various plate ending widths of $w_2$=1.5, 2.5, 3.5, and 4.5 mm at 27.5, 32.5, and 37.5 GHz, with other parameters being the same as given in Table I. With reference to FIGS. 17*a*-17*c*, Ant. III has the lowest SLL when $w_2$ equals 3.5 mm. Since this ending width also gives good impedance match (see FIG. 16), this value of $w_2$ is used in the most preferred design.

Figure 18A:
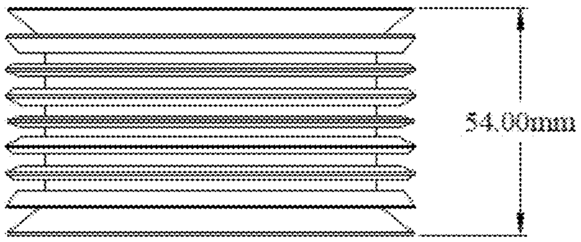
FIG. 18*a* is a side view photo of a prototype of antenna made according to Ant. III.
Figure 18B:
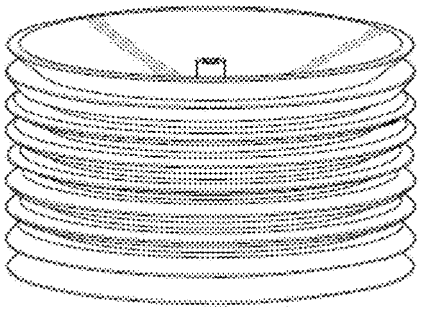
FIG. 18*b* is a perspective view photo of the prototype in FIG. 18*a*.

To verify the above-mentioned design idea, a prototype of Ant. III was fabricated, as shown in FIGS. 18*a*-18*b*. Both the antenna and the holding rings were fabricated by using the CNC method.

Figure 19:
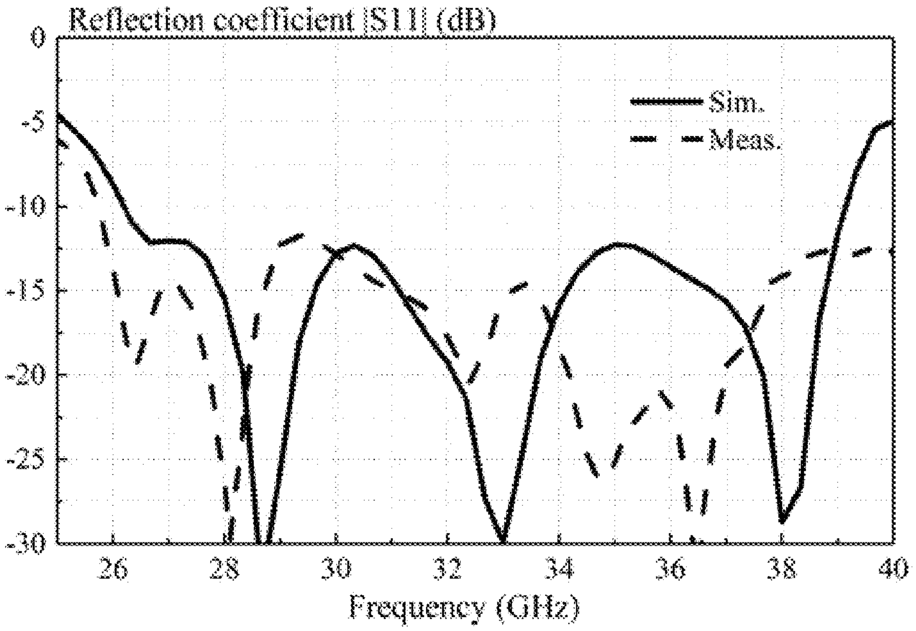
FIG. 19 illustrates measured (based on the prototype in FIGS. 18*a* and 18*b*) and simulated reflection coefficients of Ant. III.

FIG. 19 shows the measured and simulated impedance bandwidths of the proposed antenna. The measured −10-dB impedance bandwidth ($|S_{11}| \leq -10$ dB) is 43.9% (25.6-40.0 GHz), which is in reasonable agreement with the simulated impedance bandwidth of 39.4% (26.3-39.2 GHz).

Figure 20:
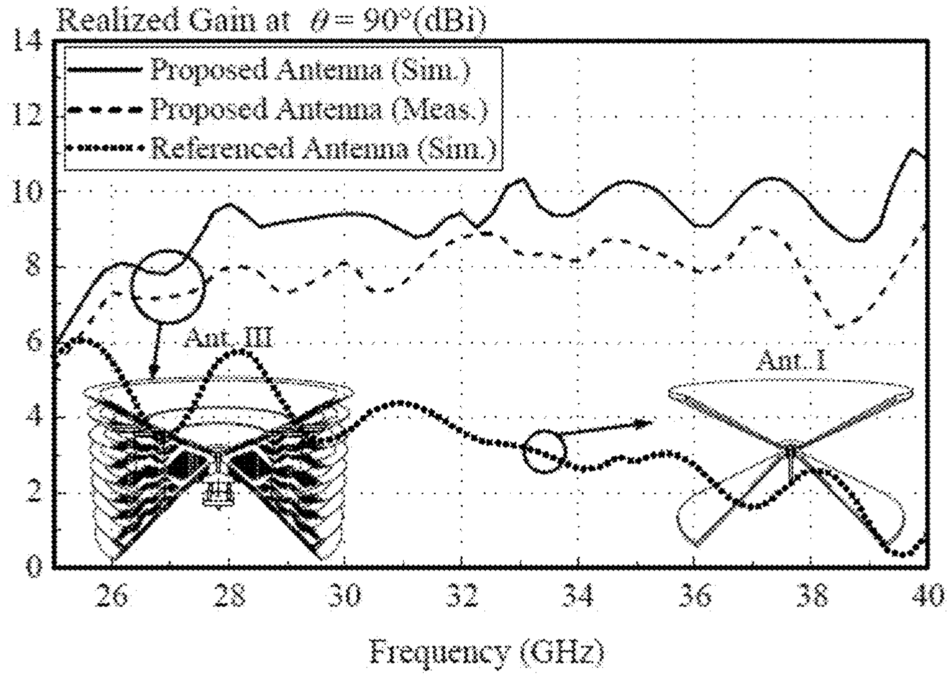
FIG. 20 shows measured (based on the prototype in FIGS. 18*a* and 18*b*) and simulated realized gains of Ant. III as compared to a reference antenna (Ant. I).
Figure 21A:
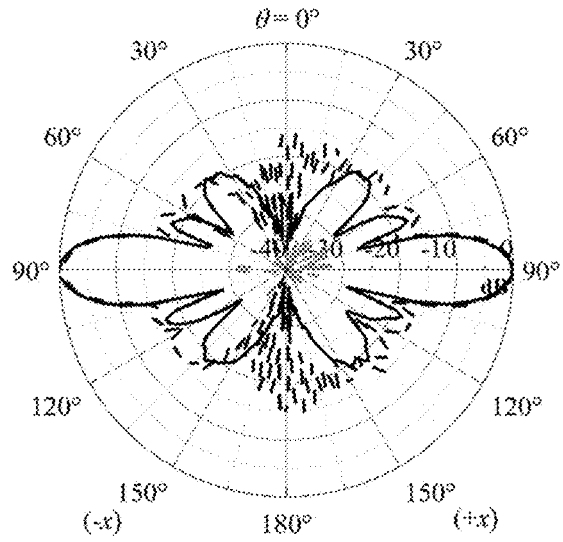
FIG. 21*a* illustrates measured (based on the prototype in FIGS. 18*a* and 18*b*) and simulated radiation pattern in the E-plane of Ant. III at 27.5 GHz.
Figure 21B:
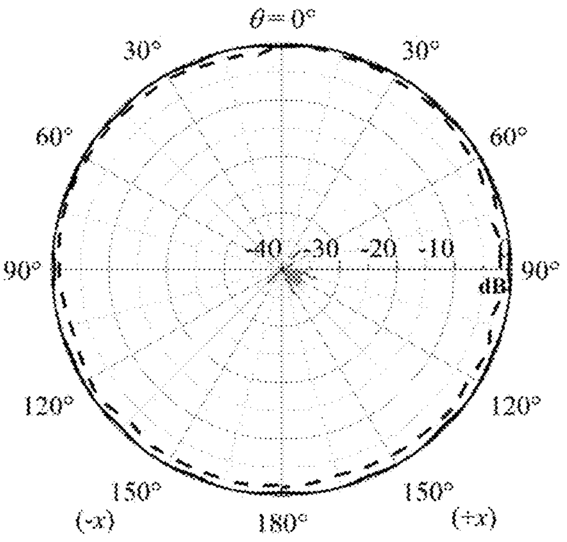
FIG. 21*b* illustrates measured (based on the prototype in FIGS. 18*a* and 18*b*) and simulated radiation pattern in the H-plane of Ant. III at 27.5 GHz.
Figure 22A:
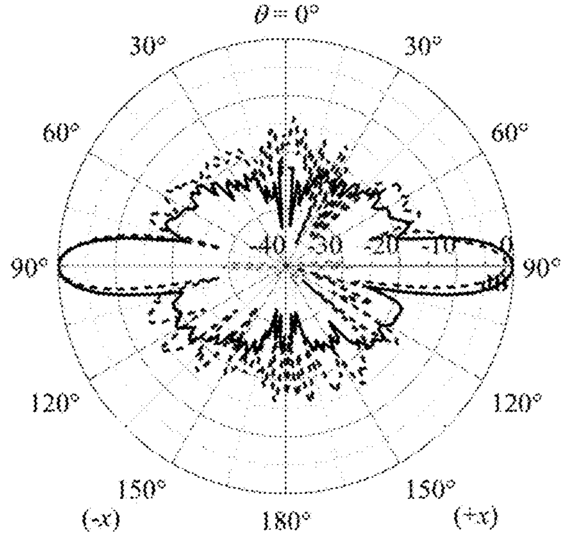
FIG. 22*a* illustrates measured (based on the prototype in FIGS. 18*a* and 18*b*) and simulated radiation pattern in the E-plane of Ant. III at 32.5 GHz.
Figure 22B:
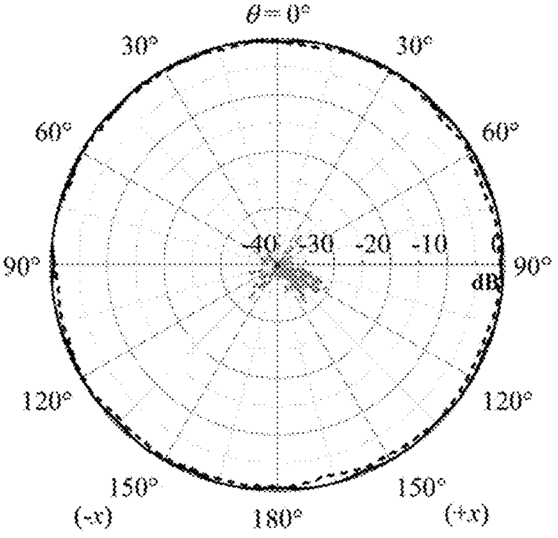
FIG. 22*b* illustrates measured (based on the prototype in FIGS. 18*a* and 18*b*) and simulated radiation pattern in the H-plane of Ant. III at 32.5 GHz.
Figure 23A:
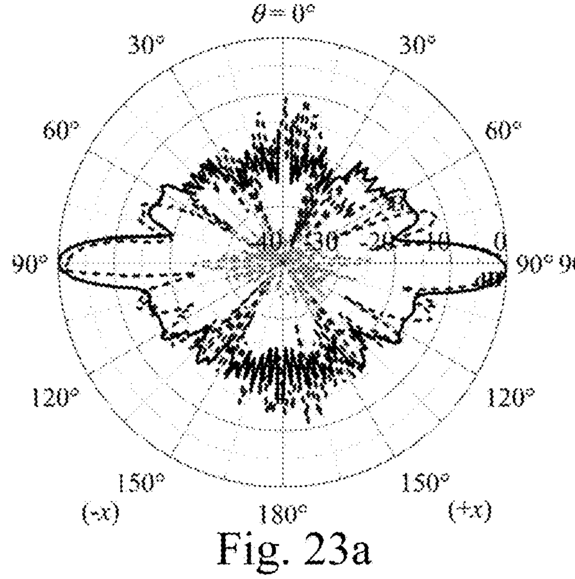
FIG. 23*a* illustrates measured (based on the prototype in FIGS. 18*a* and 18*b*) and simulated radiation pattern in the E-plane of Ant. III at 37.5 GHz.
Figure 23B:
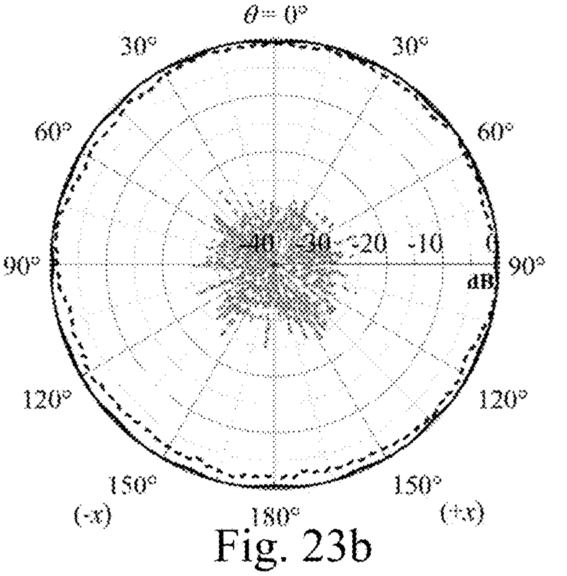
FIG. 23*b* illustrates measured (based on the prototype in FIGS. 18*a* and 18*b*) and simulated radiation pattern in the H-plane of Ant. III at 37.5 GHz.

FIG. 20 presents the measured and simulated realized gains of the antenna at θ=90°. With reference to FIG. 20, reasonable agreement can be found between the measured and simulated results, with the differences caused by experimental imperfections including assembly errors. It has a measured peak gain of 9.2 dBi at 37.1 GHz. Its simulated and measured 1-dB gain bandwidths are 18.3% (27.3-32.8 GHz) and 20.0% (25.6-31.3 GHz), respectively. The measured gain fluctuation is less than 3 dB across the entire impedance passband (25.6-40.0 GHz). For comparison, a reference conventional biconical antenna having the same aperture size and flare angle was simulated. The simulated realized gain of the proposed antenna was found to be 6 dB higher than that of the reference antenna at 32.5 GHz (the center frequency).

FIGS. 21*a*-23*b* show the measured and simulated normalized radiation patterns of the antenna. As can be observed from these figures, agreement between the measured and simulated omnidirectional radiation patterns is reasonable. The simulated cross-polar field is very low because of the good purity of the E-field in the designed metal lens. It is consistent with the weak measured cross-polar field of lower than −25 dB as found in the figures.

TABLE III

MEASURED AND SIMULATED REALIZED GAINS AND HALF-POWER BEAMWIDTHS (HPBWS) ACROSS IMPEDANCE PASSBAND

| Frequency (GHz) | | 27.5 | 32.5 | 37.5 |
|---|---|---|---|---|
| Realized gain | Simulation | 8.4 dB | 9.4 dB | 10.3 dB |
| | Measurement | 7.6 dB | 8.8 dB | 9.0 dB |
| HPBW (E-plane) | Simulation | 13.0° | 10.9° | 9.4° |
| | Measurement | 13.8° | 11.0° | 9.0° |
| Pattern ripple (H-plane) | Simulation | 0.6 dB | 0.6 dB | 0.6 dB |
| | Measurement | 2.6 dB | 1.2 dB | 2.7 dB |

Table III above lists the simulated and measured radiation characteristics of the antenna, including the measured and simulated realized gains, half-power beamwidths (HPBWs), and ripples of the normalized radiation patterns. With reference to Table III, the measured pattern ripples in the elevation (x-z) plane are less than 3 dB at all three frequencies. They are higher than the simulated results due to experimental tolerances.

Table IV shown in FIG. 24 compares the proposed antenna with reported gain-enhanced omnidirectional biconical antennas. With reference to Table IV, the antennas in [14] and [22] have higher realized gains but narrower 10-dB impedance bandwidths. They suffer from either the bulky size [14] or huge pattern ripple [22]. The proposed antenna has the widest impedance and gain bandwidths among the designs in the table. Also, the proposed antenna has a realized gain of more than 9 dB with a comparable pattern ripple level. With these favorable results, the proposed antenna is a good candidate for mm-wave wireless communication systems.

In summary, for the proposed antenna, its prototype was found to have the measured and simulated −10-dB impedance bandwidths of 39.4% and 43.9%, respectively. Its maximum measured realized gain is 9.2 dBi. Also, a stable gain with less than 3-dB fluctuation has been found across the entire impedance passband. The prototype has a measured 1-dB gain bandwidth of 20%. It has been found that as compared with a conventional biconical antenna, the proposed antenna has a higher gain of over 8 dB with almost the same impedance bandwidth.

The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

The omnidirectional biconical antennas such as those depicted in FIGS. 1-3 and FIG. 6 can be the element of antenna arrays according to other embodiments of the invention. In addition, although specific values are provided for the exemplary embodiments described above, in variations of the embodiments, the flare angle and axial length of the metal lens can be changed to different values. The number of sub-channels can similarly be changed to different values. The operating frequency of the antenna can also be changed to other frequency bands.

The material of the omnidirectional biconical antennas and designed gain-enhancing lenses can be any kind of metal, which can be fabricated by 3D printing or computer numerical control machining. Two antennas can be fed by SMA or waveguide. The power divider and metal lens may be integrated with a biconical antenna.

In the embodiments depicted in FIGS. 1-3, the metal plates are shown are shown with shaped defined by a ring function and a sine function. However, the shapes of the annual metal plates are by no means limited to a sinusoidal shape. Those skilled in the art should understand that all types of shapes can also be used such as serrated, square, sinusoidal or other different geometric shapes.

What is claimed is:

1. An omnidirectional biconical antenna, comprising:

a) a first funnel-shaped plate having a wide end and a narrow end;

b) a second funnel-shaped plate having a wide end and a narrow end; the second funnel-shaped plate inversely positioned relative to the first funnel-shaped plate, such that the narrow ends of the second funnel-shaped plate and the first funnel-shaped plate point to each other; and c) an annular metal lens delimited by the second funnel-shaped plate and the first funnel-shaped plate.

2. The omnidirectional biconical antenna according to claim 1, wherein the annular metal lens comprises a plurality of annular metal plates concentrically arranged with and located between the second funnel-shaped plate and the first funnel-shaped plate, whilst being disconnected from each other.

3. The omnidirectional biconical antenna according to claim 2, wherein at least one of the annular metal plates has a spatially curved shape.

4. The omnidirectional biconical antenna according to claim 3, wherein the at least one of the annular metal plates has a shape described by a sine function and a ring function in altitude and azimuth planes.

5. The omnidirectional biconical antenna according to claim 3, wherein the at least one of the annular metal plates has a thickness in an altitude plane that substantially increases along a second direction from a rotational axis of the second funnel-shaped plate and the first funnel-shaped plate and extending substantially radially outward.

6. The omnidirectional biconical antenna according to claim 2, wherein the second funnel-shaped plate and the first funnel-shaped plate are part of the annular metal lens.

7. The omnidirectional biconical antenna according to claim 2, further comprises a plurality of holding rings each sandwiched by two adjacent plates among the second funnel-shaped plate, the first funnel-shaped plate, and the plurality of annular metal plates.

8. The omnidirectional biconical antenna according to claim 7, wherein the plurality of holding rings is aligned in a first direction defined by a rotational axis of the second funnel-shaped plate and the first funnel-shaped plate.

9. The omnidirectional biconical antenna according to claim 7, wherein the plurality of holding rings is made of Teflon.

10. The omnidirectional biconical antenna according to claim 2, wherein the number of the plurality of annular metal plates is an odd number; a first part of the plurality of annular metal plates located on one side of a central plate among the plurality of annular metal plates, being symmetric to a second part of the plurality of annular metal plates located on another side of the central plate.

11. The omnidirectional biconical antenna according to claim 1, wherein at least one of the second funnel-shaped plate and the first funnel-shaped plate comprises, between its narrow end and wide end, a flat portion between two ramp portions.

* * * * *